United States Patent
Wu et al.

(10) Patent No.: US 10,673,237 B2
(45) Date of Patent: Jun. 2, 2020

(54) REACTIVE POWER OPTIMIZATION METHOD

(71) Applicant: Tsinghua University, Beijing (CN)

(72) Inventors: Wenchuan Wu, Beijing (CN); Boming Zhang, Beijing (CN); Hongbin Sun, Beijing (CN); Chenhui Lin, Beijing (CN); Bin Wang, Beijing (CN); Qinglai Guo, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 387 days.

(21) Appl. No.: 15/638,648

(22) Filed: Jun. 30, 2017

(65) Prior Publication Data

US 2018/0041036 A1    Feb. 8, 2018

(30) Foreign Application Priority Data

Aug. 2, 2016    (CN) .......................... 2016 1 0623913

(51) Int. Cl.
| | |
|---|---|
| *H02J 3/20* | (2006.01) |
| *H02J 3/18* | (2006.01) |
| *G06F 17/11* | (2006.01) |
| *H02J 3/00* | (2006.01) |

(52) U.S. Cl.
CPC ................ *H02J 3/20* (2013.01); *G06F 17/11* (2013.01); *H02J 3/18* (2013.01); *H02J 2203/20* (2020.01)

(58) Field of Classification Search
CPC .......... H02J 3/20; H02J 2003/007; H02J 3/18; H02J 3/382; G06F 17/11
See application file for complete search history.

(56) References Cited

U.S. PATENT DOCUMENTS

| | | | |
|---|---|---|---|
| 2013/0018517 A1* | 1/2013 | Kalagnanam | ......... G06Q 50/06 700/291 |
| 2014/0052301 A1* | 2/2014 | Raghunathan | ........... H02J 3/00 700/286 |

OTHER PUBLICATIONS

Tao Ding, et al., "A Two-Stage Robust Reactive Power Optimization Considering Uncertain Wind Power Integration in Active Distribution Networks," IEEE Transactions on Sustainable Energy, vol. 7, No. 1 (2016) (Year: 2016).*

(Continued)

*Primary Examiner* — Rehana Perveen
*Assistant Examiner* — Steven W Crabb
(74) *Attorney, Agent, or Firm* — Hodgson Russ LLP

(57) ABSTRACT

A reactive power optimization method for integrated transmission and distribution networks related to a field of operation and control technology of an electric power system is provided. The reactive power optimization method includes: establishing a reactive power optimization model for a transmission and distribution network consisting of a transmission network and a plurality of distribution networks, in which the reactive power optimization model includes an objective function and a plurality of constraints; performing a second order cone relaxation on a non-convex constraint of a plurality of distribution network constraints of the plurality of constraints; and solving the reactive power optimization model by using a generalized Benders decomposition method so as to control each generator in the transmission network and each generator in the plurality of distribution networks.

17 Claims, 1 Drawing Sheet

(56) References Cited

OTHER PUBLICATIONS

Johanna Barr, et al., "Integration of Distributed Generation in the Volt/VAR Management System for Active Distribution Networks," IEEE Transactions on Smart Grid, vol. 6, No. 2 (2015) (Year: 2015).*

Hamed Nafisi, et al., "Two-Stage Optimization Method for Energy Loss Minimization in Microgrid Based on Smart Power Management Scheme of PHEVs," IEEE Transactions on Smart Grid, vol. 7, No. 3 (2016) (Year: 2016).*

Zheng, Weiye et al., "A Fully Distributed Reactive Power Optimization and Control Method for Active Distribution Networks," IEEE Transactions on Smart Grid, vol. 7, No. 2 pp. 1021-1033 (2016) (Year: 2016).*

\* cited by examiner

REACTIVE POWER OPTIMIZATION METHOD

CROSS-REFERENCE TO RELATED APPLICATIONS

This application is based on and claims priority of Chinese Patent Application No. 2016106239138, filed on Aug. 2, 2016.

FIELD

The present disclosure relates to a field of operation and control technology of an electric power system, and more particularly relates to a reactive power optimization method.

BACKGROUND

With a massive integration of distributed renewable energy resources such as wind and photovoltaic, traditional distribution networks have been developing as active distribution networks. In the active distribution network, massive distributed renewable energy resources are integrated such that the electric energy production changes quickly and randomly over time. Traditionally, a transmission network and a distribution network are optimized independently, in which the distribution network is equal to a load node in the transmission network, and the transmission network is equal to an electric generator balance node in the distribution network.

However, in the active distribution network, it is disadvantageous in that: (1) the massive distributed renewable energy resources lead to the strong randomness of the distribution network and there is a tight coupling between the distribution network and the transmission network, such that an independent reactive power control mode will cause a huge amount of power mismatch loss at the boundary of the transmission and distribution network; (2) since there is a massive integration of distributed renewable energy resources in the distribution network, there will be a problem such as overvoltage at a power injection node, and the distribution network needs a cooperation with the transmission network to eliminate the overvoltage; (3) for the transmission and distribution network, there is a lack of coordination between the transmission network and the distribution network, which is unable to ensure an optimal economic objective for the transmission and distribution network.

SUMMARY

A generalized Benders decomposition method may be used to solve a global optimization problem by dividing the global optimization problem into several independent sub-optimization problems. An original problem is divided into a primal problem and several sub-problems, that is suitable for distributed optimization problems. The sub-problems solved by the generalized Benders decomposition method is required to be convex.

However, a constraint in a reactive power optimization model is non-convex. In order to use the generalized Benders decomposition method to solve the reactive power optimization model, the present disclosure applies a second order cone relaxation method. With the reactive power optimization method, according to embodiments of the present disclosure, convergence rate is faster, and the reactive power optimization method is suitable for a practical operation.

According to a first aspect of embodiments of the present disclosure, there is provided a reactive power optimization method, including: establishing a reactive power optimization model for an integrated network consisting of a transmission network and a plurality of distribution networks based on a first active power output of a generator at each node in the transmission network acquired from a dispatch schedule of a transmission network operator, a first load at each node in the transmission network acquired from a load forecast system of the transmission network, a second active power output of a generator at each node in the plurality of distribution networks acquired from a dispatch schedule of each distribution network operator and a second load at each node in the plurality of distribution networks acquired from a load forecast system of each distribution network, in which the reactive power optimization model includes an objective function and a plurality of constraints, and the plurality of constraints include a plurality of transmission network constraints, a plurality of distribution network constraints and boundary constraints between the transmission network and the plurality of distribution networks; performing a second order cone relaxation on a non-convex constraint of the plurality of distribution network constraints; solving the reactive power optimization model to acquire a first reactive power output of the generator at each node in the transmission network, a second reactive power output of the generator at each node in the plurality of distribution networks, so as to control each generator in the transmission network and each generator in the plurality of distribution networks according to the first reactive power output of the generator at each node in the transmission network, the second reactive power output of the generator at each node in the plurality of distribution networks, so as to optimize the transmission and distribution network.

In the embodiments of the present disclosure, the objective function is established for minimizing a total network loss of the integrated network as follows:

$$\min\left(\left(\sum_{i\in I^t}(P_{Gi}^t - P_{Di}^t)\right) + \sum_{k\in DIST}\left(\sum_{i\in I^{d,k}}(P_{Gi}^{d,k} - P_{Di}^{d,k})\right)\right) \quad (1)$$

where $P_{Gi}^t$ represents a first active power output of a generator at an $i^{th}$ node of the transmission network, $P_{Di}^t$ represents a first active load at the $i^{th}$ node of the transmission network, $P_{Gi}^{d,k}$ represents a second active power output of a generator at an $i^{th}$ node of a $k^{th}$ distribution network, $P_{Di}^{d,k}$ represents a second active load at the $i^{th}$ node of the $k^{th}$ distribution network, $I^t$ represents an index set of nodes in the transmission network, $I^{d,k}$ represents an index set of nodes in the $k^{th}$ distribution network, and DIST represents an index set of the plurality of distribution networks.

In the embodiments of the present disclosure, the plurality of transmission network constraints include first power flow constraints and first security constraints, in which the power flow constraints are represented as:

$$P_{ij}^t = V_i^t V_j^t (G_{ij}^t \cos\theta_{ij}^t + B_{ij}^t \sin\theta_{ij}^t) \quad (2)$$

$$Q_{ij}^t = V_i^t V_j^t (G_{ij}^t \sin\theta_{ij}^t - B_{ij}^t \cos\theta_{ij}^t) \quad (3)$$

-continued $$\sum_{j\in\pi(i)} P_{ij}^t = P_{Gi}^t - P_{Di}^t \quad (4)$$

$$\sum_{j\in\pi(i)} Q_{ij}^t = Q_{Gi}^t - Q_{Di}^t \quad (5)$$

where $P_{ij}^t$ represents an active power flow of an $(ij)^{th}$ branch of the transmission network, $Q_{ij}^t$ represents a reactive power flow of the $(ij)^{th}$ branch of the transmission network, $V_i^t$ represents a voltage magnitude at the $i^{th}$ node of the transmission network, $V_j^t$ represents a voltage magnitude at a $j^{th}$ node of the transmission network, $G_{ij}^t$ represents an equivalent conductance of the $(ij)^{th}$ branch of the transmission network, $B_{ij}^t$ represents an equivalent susceptance of the $(ij)^{th}$ branch of the transmission network, $\theta_{ij}^t$ represents a voltage angle difference of the $(ij)^{th}$ branch of the transmission network, $\pi(i)$ represents a set of nodes directly connected to the $i^{th}$ node of the transmission network, $Q_{Gi}^t$ represents a reactive power output of the generator at the $i^{th}$ node of the transmission network, and $Q_{Di}^t$ represents a reactive load of at the $i^{th}$ node of the transmission network; and the first security constraints are represented as:

$$P_{Gi,min}^t \leq P_{Gi}^t \leq P_{Gi,max}^t \quad (6)$$

$$Q_{Gi,min}^t \leq Q_{Gi}^t \leq Q_{Gi,max}^t \quad (7)$$

$$V_{i,min}^t \leq V_i^t \leq V_{i,max}^t \quad (8)$$

$$(P_{ij}^t)^2 + (Q_{ij}^t)^2 \leq (S_{ij,max}^t)^2 \quad (9)$$

where $P_{Gi,min}^t$ represents a minimum active power output of the generator at the $i^{th}$ node of the transmission network, $P_{Gi,max}^t$ represents a maximum active power output of the generator at the $i^{th}$ node of the transmission network, $Q_{Gi,min}^t$ represents a minimum reactive power output of the generator at the $i^{th}$ node of the transmission network, $Q_{Gi,max}^t$ represents a maximum reactive power output of the generator at the $i^{th}$ node of the transmission network, $V_{i,min}^t$ represents a minimum voltage magnitude at the $i^{th}$ node of the transmission network, $V_{i,max}^t$ represents a maximum voltage magnitude at the $i^{th}$ node of the transmission network, and $S_{ij,max}^t$ represents a transmission capacity of the $(ij)^{th}$ branch of the transmission network.

In the embodiments of the present disclosure, the plurality of distribution network constraints include second power flow constraints and second security constraints, in which the second power flow constraints are represented as:

$$(P_{ij}^d)^2 + (Q_{ij}^d)^2 = (I_{ij}^d)^2 (V_i^d)^2 \quad (10)$$

$$\sum_{i\in u(j)} \left(P_{ij}^d - (I_{ij}^d)^2 r_{ij}^d\right) + P_{Gj}^d = \sum_{k\in v(j)} (P_{jk}^d) + P_{Dj}^d \quad (11)$$

$$\sum_{i\in u(j)} \left(Q_{ij}^d - (I_{ij}^d)^2 x_{ij}^d\right) + Q_{Gj}^d = \sum_{k\in v(j)} (Q_{jk}^d) + Q_{Dj}^d \quad (12)$$

$$(V_j^d)^2 = (V_i^d)^2 - 2(r_{ij}^d P_{ij}^d + x_{ij}^d Q_{ij}^d) + ((r_{ij}^d)^2 + (x_{ij}^d)^2)(I_{ij}^d)^2 \quad (13)$$

where $P_{ij}^d$ represents an active power flow of an $(ij)^{th}$ branch of the plurality of distribution networks, $Q_{ij}^d$ represents a reactive power flow of the $(ij)^{th}$ branch of the plurality of distribution networks, $I_{ij}^d$ represents a current magnitude of the $(ij)^{th}$ branch of the plurality of distribution networks, $V_i^d$ represents a voltage magnitude at an $i^{th}$ node of the plurality of distribution networks, $r_{ij}^d$ represents a resistance of the $(ij)^{th}$ branch of the plurality of distribution networks, $x_{ij}^d$ represents a reactance of the $(ij)^{th}$ branch of the plurality of distribution networks, $u(j)$ represents a set of parent nodes of a $j^{th}$ node of the plurality of distribution networks, $v(j)$ represents a set of child nodes of the $j^{th}$ node of the plurality of distribution networks, $P_{Gj}^d$ represents an active power output of a generator at the $j^{th}$ node of the plurality of distribution networks, $P_{Dj}^d$ represents an active load at the $j^{th}$ node of the plurality of distribution networks, $Q_{Gj}^d$ represents a reactive power output of the generator at the $j^{th}$ node of the plurality of distribution networks, $Q_{Dj}^d$ represents a reactive load at the $j^{th}$ node of the plurality of distribution networks, $P_{jk}^d$ represents an active power flow of a $(jk)^{th}$ branch of the plurality of distribution networks, and $Q_{jk}^d$ represents a reactive power flow of the $(jk)^{th}$ branch of the plurality of distribution networks; and the second security constraints are represented as:

$$P_{Gi,min}^d \leq P_{Gi}^d \leq P_{Gi,max}^d \quad (14)$$

$$Q_{Gi,min}^d \leq Q_{Gi}^d \leq Q_{Gi,max}^d \quad (15)$$

$$V_{i,min}^d \leq V_i^d \leq V_{i,max}^d \quad (16)$$

$$I_{ij}^d \leq I_{ij,max}^d \quad (17)$$

where $P_{Gi}^d$ represents an active power output of a generator at the $i^{th}$ node of the plurality of distribution networks, $P_{Gi,min}^d$ represents a minimum active power output of the generator at the $i^{th}$ node of the plurality of distribution networks, $P_{Gi,max}^d$ represents a maximum active power output of the generator at the $i^{th}$ node of the plurality of distribution networks, $Q_{Gi}^d$ represents a reactive power output of the generator at the $i^{th}$ node of the plurality of distribution networks, $Q_{Gi,min}^d$ represents a minimum reactive power output of the generator at the $i^{th}$ node of the plurality of distribution networks, $P_{Gi,max}^d$ represents a maximum reactive power output of the generator at the $i^{th}$ node of the plurality of distribution networks, $V_i^d$ represents a voltage magnitude at the $i^{th}$ node of the plurality of distribution networks, $V_{i,min}^d$ represents a minimum voltage magnitude at the $i^{th}$ node of the plurality of distribution networks, $V_{i,max}^d$ represents a maximum voltage magnitude at the $i^{th}$ node of the plurality of distribution networks, $I_{ij}^d$ represents a current magnitude of the $(ij)^{th}$ branch of the plurality of distribution networks, and $I_{ij,max}^d$ represents an upper limit of the current magnitude of the $(ij)^{th}$ branch of the plurality of distribution networks.

In the embodiments of the present disclosure, the boundary constraints are represented as:

$$V_{\tau(k)}^t = V_{root}^{d,k} \quad (18)$$

$$P_{\tau(k)}^t = P_{root}^{d,k} \quad (19)$$

$$Q_{\tau(k)}^t = Q_{root}^{d,k} \quad (20)$$

where $V_{\tau(k)}^t$ represents a voltage magnitude at a node in the transmission network connected to the $k^{th}$ distribution network, $V_{root}^{d,k}$ represents a voltage magnitude at a root node of the $k^{th}$ distribution network, $P_{\tau(k)}^t$ represents an equivalent active load of the $k^{th}$ distribution network in the transmission network, $P_{root}^{d,k}$ represents an active power injection from the transmission network to the root node of the $k^{th}$ distribution network, $Q_{\tau(k)}^t$ represents an equivalent reactive load of the $k^{th}$ distribution network in the transmission network, and represents an reactive power injection from the transmission network to the root node of the $k^{th}$ distribution network.

In the embodiments of the present disclosure, performing the second order cone relaxation on the non-convex constraints of the plurality of distribution network constraints includes:

introducing a first variable $L_{ij}^d$ and a second variable $U_i^d$ as follows:

$$L_{ij}^d = (I_{ij}^d)^2 \tag{21}$$

$$U_i^d = (V_i^d)^2 \tag{22}$$

simplifying the second power flow constraints using the first variable $L_{ij}^d$ and the second variable $U_i^d$ as follows:

$$(P_{ij}^d)^2 + (Q_{ij}^d)^2 = L_{ij}^d U_i^d \tag{23}$$

$$\sum_{i \in u(j)} (P_{ij}^d - L_{ij}^d r_{ij}^d) + P_{Gj}^d = \sum_{k \in v(j)} (P_{jk}^d) + P_{Dj}^d \tag{24}$$

$$\sum_{i \in u(j)} (Q_{ij}^d - L_{ij}^d x_{ij}^d) + Q_{Gj}^d = \sum_{k \in v(j)} (Q_{jk}^d) + Q_{Dj}^d \tag{25}$$

$$U_j^d = U_i^d - 2(r_{ij}^d P_{ij}^d + x_{ij}^d Q_{ij}^d) + \left((r_{ij}^d)^2 + (x_{ij}^d)^2\right) L_{ij}^d \tag{26}$$

transforming formula (16) in the second security constraints to formula (27) using the second variable $U_i^d$:

$$(V_{i,min}^d)^2 \le U_i^d \le (V_{i,max}^d)^2 \tag{27}$$

performing a relaxation on formula (23) so as to acquire a formula of:

$$(P_{ij}^d)^2 \le (Q_{ij}^d)^2 \le L_{ij}^d U_i^d)^2 \tag{28}$$

representing the formula (28) in a format of standard second order cone constraint as follow:

$$\left\| \begin{matrix} 2P_{ij}^d \\ 2Q_{ij}^d \\ L_{ij}^d - U_i^d \end{matrix} \right\|_2 \le L_{ij}^d + U_i^d \tag{29}$$

In the embodiments of the present disclosure, the reactive power optimization model is solved by using a generalized Benders decomposition method, and solving the reactive power optimization model includes: setting an initial iteration times q=0; establishing a primal problem model and a plurality of sub-problem models by decomposing the reactive power optimization model based on the generalized Benders decomposition method; solving the primal problem model by the transmission network operator and the plurality of sub-problem models by the plurality of distribution network operators respectively; and judging that an iteration for solving the reactive power optimization model is convergent if all of the plurality of sub-problem models are feasible, and stopping the iteration; generating a feasible cut for each infeasible sub-problem model if there is at least one infeasible sub-problem model, and performing a next iteration by solving the primal problem model by the transmission network operator and the plurality of sub-problem models undergoing the feasible cut by the plurality of distribution network operators respectively again.

In the embodiments of the present disclosure, the primal problem model is represented as formula (30) and an optimal solution of the primal problem model is $\hat{y}$:

$$\min_{y \in Y} P_{G,ref}^t \tag{30}$$

$$\text{s.t. } L_*(y, \lambda^j) \le 0, \ j = 1, 2, \ldots, q$$

where y represents a vector of all variables of the transmission network, Y represents a set of all the transmission network constraints, $P_{G,ref}^t$ is an active power output of a generator at a reference node of the transmission network, $\lambda^j$ is a multiplier, $L^*$ is a function representing the feasible cut;

the sub-problem model for the $k^{th}$ distribution network is represented as formula (31):

$$\min_{x_k} f_k(x_k, \hat{y}) \tag{31}$$

$$\text{s.t. } H_k(x_k, \hat{y}) = 0$$

$$x_k \in X_k$$

where $x_k$ represents a vector of variables of the $k^{th}$ distribution network, $\hat{y}$ represents a solution obtained from (30), $f_k$ represents a function of network loss of the $k^{th}$ distribution network, $H_k(x_k, \hat{y})=0$ are a vector of boundary constraints between the transmission network and the $k^{th}$ distribution network, $X_k$ is a set of all constraints of the $k^{th}$ distribution network.

In the embodiments of the present disclosure, generating a feasible cut for at least one infeasible sub-problem model includes:

generating the sub-problem model satisfying a relaxed boundary constraint as follows:

$$\min_{x_k \in X_k} \sum_{i=1}^{6} \alpha_i \tag{32}$$

$$\text{s.t. } P_{root}^{d,k} - \hat{P}_{\tau(k)}^t \le \alpha_1, \ -P_{root}^{d,k} + \hat{P}_{\tau(k)}^t \le \alpha_2$$

$$Q_{root}^{d,k} - \hat{Q}_{\tau(k)}^t \le \alpha_3, \ -Q_{root}^{d,k} + \hat{Q}_{\tau(k)}^t \le \alpha_4$$

$$U_{root}^{d,k} - (\hat{V}_{\tau(k)}^t)^2 \le \alpha_5, \ -U_{root}^{d,k} + (\hat{V}_{\tau(k)}^t)^2 \le \alpha_6$$

$$\alpha_i \ge 0,$$

$$i = 1, 2, \ldots, 6$$

where $\hat{P}_{\tau(k)}^t$, $\hat{Q}_{\tau(k)}^t$ and $\hat{V}_{\tau(k)}^t$ represent variables transferred from the primal problem model, $\hat{P}_{root}^{d,k}$ root is a square of $V_{root}^{d,k}$ in (18), $\alpha_1 \sim \alpha_6$ are relaxation terms;

solving the sub-problem model satisfying the relaxed boundary constraint, in which Lagrangian multipliers in formula (32) are $\lambda_1 \sim \lambda_6$ corresponding to inequations whose right sides are $\alpha_1 - \alpha_6$;

introducing variables $\lambda_P$, $\lambda_Q$ and $\lambda_V$ as follows:

$$\lambda_P = \lambda_1 - \lambda_2$$

$$\lambda_Q = \lambda_3 - \lambda_4$$

$$\lambda_V = \lambda_5 - \lambda_6 \tag{33}$$

generating the feasible cut:

$$L_*(y, \hat{\lambda}) = \inf_{x \in X} \{\hat{\lambda}^T H(x, y)\}, \ y \in Y \tag{34}$$

-continued $$= \inf_{x \in X} \left\{ \begin{array}{c} \lambda_P(P_{root}^{d,k} - P_{\tau(k)}^t) + \lambda_Q(Q_{root}^{d,k} - Q_{\tau(k)}^t) + \\ \lambda_V(U_{root}^{d,k} - (V_{\tau(k)}^t)^2) \end{array} \right\}, y \in Y$$

$$= \inf_{x \in X} \{\lambda_P P_{root}^{d,k} + \lambda_Q Q_{root}^{d,k} + \lambda_V U_{root}^{d,k}\} -$$

$$(\lambda_P P_{\tau(k)}^t + \lambda_Q Q_{\tau(k)}^t + \lambda_V (V_{\tau(k)}^t)^2), y \in Y$$

simplifying formula (34) to a formula of $$\lambda_P P_{\tau(k)}^t + \lambda_Q Q_{\tau(k)}^t + \lambda_V (V_{\tau(k)}^t)^2 \geq \lambda_{val} \quad (35)$$

where $$\lambda_{val} = \inf_{x \in X} \{\lambda_P P_{root}^{d,k} + \lambda_Q Q_{root}^{d,k} + \lambda_V U_{root}^{d,k}\} \quad (36)$$

representing the feasible cut of formula (35) as follows:

$$L_*(y, \hat{\lambda}) = \inf_{x_k \in X_k} \{\hat{\lambda}^T H(x_k, y)\}, y \in Y \quad (37)$$

adding one on q and letting $\lambda^q = \hat{\lambda}$.

According to a second aspect of embodiments of the present disclosure, there is provided a reactive power optimization apparatus, including: a processor; a memory configured to store an instruction executable by the processor; in which the processor is configured to: establish a reactive power optimization model for a transmission and distribution network consisting of a transmission network and a plurality of distribution networks based on a first active power output of a generator at each node in the transmission network acquired from a dispatch schedule of a transmission network operator, a first load at each node in the transmission network acquired from a load forecast system of the transmission network, a second active power output of a generator at each node in the plurality of distribution networks acquired from a dispatch schedule of each distribution network operator and a second load at each node in the plurality of distribution networks acquired from a load forecast system of each distribution network, in which the reactive power optimization model includes an objective function and a plurality of constraints, and the plurality of constraints include a plurality of transmission network constraints, a plurality of distribution network constraints and a boundary constraint between the transmission network and the plurality of distribution networks; perform a second order cone relaxation on a non-convex constraint of the plurality of distribution network constraints; solve the reactive power optimization model to acquire a first reactive power output of the generator at each node in the transmission network, a second reactive power output of a generator at each node in the plurality of distribution networks, so as to control each generator in the transmission network and each generator in the plurality of distribution networks according to the first reactive power output of the generator at each node in the transmission network, the second reactive power output of a generator at each node in the plurality of distribution networks, so as to optimize the transmission and distribution network.

In embodiments of the present disclosure, the objective function is established for minimizing a total network loss of the transmission and distribution network as follows:

$$\min\left(\left(\sum_{i \in I^t}(P_{Gi}^t - P_{Di}^t)\right) + \sum_{k \in DIST}\left(\sum_{i \in I^{d,k}}\left(P_{Gi}^{d,k} - P_{Di}^{d,k}\right)\right)\right) \quad (1)$$

where $P_{Gi}^t$ represents a first active power output of a generator at an $i^{th}$ node in the transmission network, $P_{Di}^t$ represents a first active load at the $i^{th}$ node in the transmission network, $P_{Gi}^{d,k}$ represents a second active power output of a generator at an $i^{th}$ node in a $k^{th}$ distribution network, $P_{Di}^{d,k}$ represents a second active load at the $i^{th}$ node in the $k^{th}$ distribution network, $I^t$ represents a set of indices of nodes in the transmission network, $I^{d,k}$ represents an index set of nodes in the $k^{th}$ distribution network, and DIST represents a set of the indices of the plurality of distribution networks.

In the embodiments of the present disclosure, the plurality of transmission network constraints include a first power flow constraint and a first security constraint, in which the first power flow constraint is represented as:

$$P_{ij}^t = V_i^t V_j^t (G_{ij}^t \cos\theta_{ij}^t + B_{ij}^t \sin\theta_{ij}^t) \quad (2)$$

$$Q_{ij}^t = V_i^t V_j^t (G_{ij}^t \sin\theta_{ij}^t - B_{ij}^t \cos\theta_{ij}^t) \quad (3)$$

$$\sum_{j \in \pi(i)} P_{ij}^t = P_{Gi}^t - P_{Di}^t \quad (4)$$

$$\sum_{j \in \pi(i)} Q_{ij}^t = Q_{Gi}^t - Q_{Di}^t \quad (5)$$

where $P_{ij}^t$ represents an active power flow in an $(ij)^{th}$ branch in the transmission network, $Q_{ij}^t$ represents a reactive power flow in the $(ij)^{th}$ branch of the transmission network, $V_i^t$ represents a voltage magnitude at the $i^{th}$ node of the transmission network, $V_j^t$ represents the voltage magnitude at a $j^{th}$ node in the transmission network, $G_{ij}^t$ represents an equivalent conductance of the $(ij)^{th}$ branch in the transmission network, $B_{ij}^t$ represents an equivalent susceptance in the $(ij)^{th}$ branch in the transmission network, $\theta_{ij}^t$ represents a voltage angle difference of the $(ij)^{th}$ branch of the transmission network, $\pi(i)$ represents a set of nodes directly connected to the $i^{th}$ node of the transmission network, $Q_{Gi}^t$ represents a reactive power output of the generator at the $i^{th}$ node of the transmission network, and $Q_{Di}^t$ represents a reactive load at the $i^{th}$ node of the transmission network.

In the embodiments of the present disclosure, the first security constraint is represented as:

$$P_{Gi,min}^t \leq P_{Gi}^t \leq P_{Gi,max}^t \quad (6)$$

$$Q_{Gi,min}^t \leq Q_{Gi}^t \leq Q_{Gi,max}^t \quad (7)$$

$$V_{i,min}^t \leq V_i^t \leq V_{i,max}^t \quad (8)$$

$$(P_{ij}^t)^2 + (Q_{ij}^t)^2 \leq (S_{ij,max}^t)^2 \quad (9)$$

where $P_{Gi,min}^t$ represents a minimum active power output of the generator at the $i^{th}$ node of the transmission network, $P_{Gi,max}^t$ represents a maximum active power output of the generator at the $i^{th}$ node in the transmission network, $Q_{Gi,min}^t$ represents a minimum reactive power output of the generator at the $i^{th}$ node of the transmission network, $Q_{Gi,max}^t$ represents a maximum reactive power output of the generator at the $i^{th}$ node of the transmission network, $V_{i,min}^t$ represents a minimum voltage magnitude at the $i^{th}$ node of the transmission network, $V_{i,max}^t$ represents a maximum voltage magnitude at the $i^{th}$ node in the transmission network, and $S_{ij,max}^t$ represents a transmission capacity of the (ij)$^{th}$ branch of the transmission network.

In the embodiments of the present disclosure, the plurality of distribution network constraints include a second power flow constraints and a second security constraints, in which the second power flow constraints are represented as:

$$(P_{ij}^d)^2 + (Q_{ij}^d)^2 = (I_{ij}^d)^2(V_i^d)^2 \tag{10}$$

$$\sum_{i \in u(j)} (P_{ij}^d - (I_{ij}^d)^2 r_{ij}^d) + P_{Gj}^d = \sum_{k \in v(j)} (P_{jk}^d) + P_{Dj}^d \tag{11}$$

$$\sum_{i \in u(j)} (Q_{ij}^d - (I_{ij}^d)^2 x_{ij}^d) + Q_{Gj}^d = \sum_{k \in v(j)} (Q_{jk}^d) + Q_{Dj}^d \tag{12}$$

$$(V_j^d)^2 = (V_i^d)^2 - 2(r_{ij}^d P_{ij}^d + x_{ij}^d Q_{ij}^d) + ((r_{ij}^d)^2 + (x_{ij}^d)^2)(I_{ij}^d)^2 \tag{13}$$

where $P_{ij}^d$ represents an active power flow in an (ij)$^{th}$ branch of the plurality of distribution networks, $Q_{ij}^d$ represents a reactive power flow in the (ij)$^{th}$ branch in the plurality of distribution networks, $I_{ij}^d$ represents a current magnitude of the (ij)$^{th}$ branch of the plurality of distribution network, $V_i^d$ represents the voltage magnitude at an i$^{th}$ node of the plurality of distribution networks, $r_{ij}^d$ represents a resistance of the (ij)$^{th}$ branch of the plurality of distribution networks, $x_{ij}^d$ represents a reactance of the (ij)$^{th}$ branch of the plurality of distribution networks, u(j) represents a set of parent nodes of a j$^{th}$ node of the plurality of distribution networks, v(j) represents a set of child nodes of the j$^{th}$ node of the plurality of distribution networks, $P_{Gj}^d$ represents an active power output of a generator at the j$^{th}$ node of the plurality of distribution networks, $P_{Dj}^d$ represents an active load at the j$^{th}$ node of the plurality of distribution networks, $Q_{Gj}^d$ represents a reactive power output of the generator at the j$^{th}$ node in the plurality of distribution networks, $Q_{Dj}^d$ represents a reactive load at the j$^{th}$ node of the plurality of distribution networks, $P_{jk}^d$ represents an active power flow of a (jk)$^{th}$ branch of the plurality of distribution networks, and $Q_{jk}^d$ represents a reactive power flow of the (jk)$^{th}$ branch of the plurality of distribution networks.

In the embodiments of the present disclosure, the second security constraints are represented as:

$$P_{Gi,min}^d \le P_{Gi}^d \le P_{Gi,max}^d \tag{14}$$

$$Q_{Gi,min}^d \le Q_{Gi}^d \le Q_{Gi,max}^d \tag{15}$$

$$V_{i,min}^d \le V_i^d \le V_{i,max}^d \tag{16}$$

$$I_{ij}^d \le I_{ij,max}^d \tag{17}$$

where $P_{Gi}^d$ represents an active power output of a generator at the i$^{th}$ node of the plurality of distribution networks, $P_{Gi,min}^d$ represents a minimum active power output of the generator at the i$^{th}$ node of the plurality of distribution networks, $P_{Gi,max}^d$ represents a maximum active power output of the generator at the i$^{th}$ node of the plurality of distribution networks, $Q_{Gi}^d$ represents a reactive power output of the generator at the i$^{th}$ node of the plurality of distribution networks, $Q_{Gi,min}^d$ represents a minimum reactive power output of the generator at the i$^{th}$ node of the plurality of distribution networks, $Q_{Gi,max}^d$ represents a maximum reactive power output of the generator at the i$^{th}$ node of the plurality of distribution networks, $V_i^d$ represents a voltage magnitude at the i$^{th}$ node of the plurality of distribution networks, $V_{i,min}^d$ represents a minimum voltage magnitude at the i$^{th}$ node of the plurality of distribution networks, $V_{t,max}^d$ represents a maximum voltage magnitude at the i$^{th}$ node of the plurality of distribution networks, $I_{ij}^d$ represents a current magnitude of the (ij)$^{th}$ branch of the plurality of distribution networks, and $I_{ij,max}^d$ represents an upper limit of the current magnitude of the (ij)$^{th}$ branch of the plurality of distribution networks.

In the embodiments of the present disclosure, the boundary constraints are represented as:

$$V_{\tau(k)}^t = V_{root}^{d,k} \tag{18}$$

$$P_{\tau(k)}^t = P_{root}^{d,k} \tag{19}$$

$$Q_{\tau(k)}^t = Q_{root}^{d,k} \tag{20}$$

where $V_{\tau(k)}^t$ represents a voltage magnitude at a node in the transmission network connected to the k$^{th}$ distribution network, $V_{root}^{d,k}$ represents a voltage magnitude at a root node of the k$^{th}$ distribution network, $P_{\tau(k)}^t$ represents an equivalent active load of the k$^{th}$ distribution network in the transmission network, $P_{root}^{d,k}$ represents an active power injection from the transmission network to the root node of the k$^{th}$ distribution network, $Q_{\tau(k)}^t$ represents an equivalent reactive load of the k$^{th}$ distribution network in the transmission network, and $Q_{root}^{d,k}$ represents an reactive power injection from the transmission network to the root node of the k$^{th}$ distribution network.

In the embodiments of the present disclosure, the processor is further configured to:

introduce a first variable $L_{ij}^d$ and a second variable $U_i^d$ as follows:

$$L_{ij}^d = (I_{ij}^d)^2 \tag{21}$$

$$U_i^d = (V_i^d)^2 \tag{22}$$

simplify the second power flow constraints using the first variable $L_{ij}^d$ and the second variable $U_i^d$ as follows:

$$(P_{ij}^d)^2 + (Q_{ij}^d)^2 = L_{ij}^d U_i^d \tag{23}$$

$$\sum_{i \in u(j)} (P_{ij}^d - L_{ij}^d r_{ij}^d) + P_{Gj}^d = \sum_{k \in v(j)} (P_{jk}^d) + P_{Dj}^d \tag{24}$$

$$\sum_{i \in u(j)} (Q_{ij}^d - L_{ij}^d x_{ij}^d) + Q_{Gj}^d = \sum_{k \in v(j)} (Q_{jk}^d) + Q_{Dj}^d \tag{25}$$

$$U_j^d = U_i^d - 2(r_{ij}^d P_{ij}^d + x_{ij}^d Q_{ij}^d) + ((r_{ij}^d)^2 + (x_{ij}^d)^2) L_{ij}^d \tag{26}$$

transform formula (16) in the second security constraint to formula (27) using the second variable $U_i^d$:

$$(V_{i,min}^d)^2 \le U_i^d \le (V_{i,max}^d)^2 \tag{27}$$

perform a relaxation on formula (23) so as to acquire a formula of:

$$(P_{ij}^d)^2 (Q_{ij}^d)^2 \le L_{ij}^d U_i^d )^2 \tag{28}$$

represent the formula (28) in a format of standard second order cone constraint as follow:

$$\left\| \begin{array}{c} 2P_{ij}^d \\ 2Q_{ij}^d \\ L_{ij}^d - U_i^d \end{array} \right\|_2 \le L_{ij}^d + U_i^d \tag{29}$$

In the embodiments of the present disclosure, the reactive power optimization model is solved by using a generalized Benders decomposition method, and the processor is further configured to:

set an initial iteration times q=0;

establish a primal problem model and a plurality of sub-problem models by decomposing the reactive power optimization model based on the generalized Benders decomposition method;

solve the primal problem model by the transmission network operator and the plurality of sub-problem models by the plurality of distribution network operators respectively;

judge that an iteration for solving the reactive power optimization model is convergent if all of the plurality of sub-problem models are feasible, and stop the iteration; generate a feasible cut for each infeasible sub-problem model if there is at least one infeasible sub-problem model, and perform a next iteration by solving the primal problem model by the transmission network operator and the plurality of sub-problem models undergoing the feasible cut and by the plurality of distribution network operators respectively again.

In the embodiments of the present disclosure, the primal problem model is represented as formula (30) and an optimal solution of the primal problem model is $\hat{y}$:

$$\min_{y \in Y} P_{G,ref}^t \tag{30}$$

$$\text{s.t. } L_*(y, \lambda^j) \leq 0, j = 1, 2, \ldots, q$$

where y represents a vector of all variables of the transmission network, Y represents a set of all the transmission network constraints, $P_{G,ref}^t$ is an active power output of a generator at a reference node of the transmission network, $\lambda^j$ is a multiplier, L* is a function representing the feasible cut.

In the embodiments of the present disclosure, the sub-problem model for the $k^{th}$ distribution network is represented as formula (31):

$$\min_{x_k} f_k(x_k, \hat{y}) \tag{31}$$

$$\text{s.t. } H_k(x_k, \hat{y}) = 0$$

$$x_k \in X_k$$

where $x_k$ represents a vector of variables of the $k^{th}$ distribution network, $\hat{y}$ represents a solution obtained from (30), $f_k$ represents a function of network loss of the $k^{th}$ distribution network, $H_k(x_k,\hat{y})=0$ are a vector of boundary constraints between the transmission network and the $k^{th}$ distribution network, $X_k$ is a set of all constraints of the $k^{th}$ distribution network.

In the embodiments of the present disclosure, the processor is further configured to: generate the sub-problem model satisfying a relaxed boundary condition as follows:

$$\min_{x_k \in X_k} \sum_{i=1}^{6} \alpha_i \tag{32}$$

$$\text{s.t. } P_{root}^{d,k} - \hat{P}_{\tau(k)}^t \leq \alpha_1, -P_{root}^{d,k} + \hat{P}_{\tau(k)}^t \leq \alpha_2$$

-continued $$Q_{root}^{d,k} - \hat{Q}_{\tau(k)}^t \leq \alpha_3, -Q_{root}^{d,k} + \hat{Q}_{\tau(k)}^t \leq \alpha_4$$

$$U_{root}^{d,k} - (\hat{V}_{\tau(k)}^t)^2 \leq \alpha_5, -U_{root}^{d,k} + (\hat{V}_{\tau(k)}^t)^2 \leq \alpha_6$$

$$\alpha_i \geq 0, i = 1, 2, \ldots, 6$$

where $\hat{P}_{\tau(k)}^t$, $\hat{Q}_{\tau(k)}^t$ and $\hat{V}_{\tau(k)}^t$ represent variables transferred from the primal problem model, $U_{root}^{d,k}$ is a square of $V_{root}^{d,k}$ in (18), $\alpha_1 \sim \alpha_6$ are relaxation terms;

solve the sub-problem model satisfying the relaxed boundary condition, in which Lagrangian multipliers in formula (32) are $\lambda_1 \sim \lambda_6$ corresponding to inequations whose right sides are $\lambda_1 \sim \alpha_6$;

introduce variables $\lambda_P$, $\lambda_Q$ and $\lambda_V$ as follows:

$$\lambda_P = \lambda_1 - \lambda_2$$

$$\lambda_Q = \lambda_3 - \lambda_4$$

$$\lambda_V = \lambda_5 - \lambda_6 \tag{33}$$

generate the feasible cut:

$$L_*(y, \hat{\lambda}) = \inf_{x \in X} \{\hat{\lambda}^T H(x, y)\}, y \in Y \tag{34}$$

$$= \inf_{x \in X} \left\{ \begin{array}{c} \lambda_P(P_{root}^{d,k} - P_{\tau(k)}^t) + \lambda_Q(Q_{root}^{d,k} - Q_{\tau(k)}^t) + \\ \lambda_V(U_{root}^{d,k} - (V_{\tau(k)}^t)^2) \end{array} \right\}, y \in Y$$

$$= \inf_{x \in X} \{\lambda_P P_{root}^{d,k} + \lambda_Q Q_{root}^{d,k} + \lambda_V U_{root}^{d,k}\} -$$

$$(\lambda_P P_{\tau(k)}^t + \lambda_Q Q_{\tau(k)}^t + \lambda_V (V_{\tau(k)}^t)^2), y \in Y$$

simplify formula (34) to a formula of $$\lambda_P P_{\tau(k)}^t + \lambda_Q Q_{\tau(k)}^t + \lambda_V (V_{\tau(k)}^t)^2 \geq \lambda_{val} \tag{35}$$

where $$\lambda_{val} = \inf_{x \in X} \{\lambda_P P_{root}^{d,k} + \lambda_Q Q_{root}^{d,k} + \lambda_V U_{root}^{d,k}\} \tag{36}$$

represent the feasible cut of formula (35) as follows:

$$L_*(y, \hat{\lambda}) = \inf_{x_k \in X_k} \{\hat{\lambda}^T H(x_k, y)\}, y \in Y \tag{37}$$

add one on q and set $\lambda^q = \hat{\lambda}$.

According to a third aspect of embodiments of the present disclosure, there is provided a non-transitory computer-readable storage medium having stored therein instructions that, when executed by a processor of a terminal, causes the terminal to perform a reactive power optimization method for running an application program, the reactive power optimization method includes: establishing a reactive power optimization model for a transmission and distribution network consisting of a transmission network and a plurality of distribution networks based on a first active power output of a generator at each node in the transmission network acquired from a dispatch schedule of a transmission network operator, a first load at each node in the transmission network acquired from a load forecast system of the transmission network, a second active power output of a generator at each node in the plurality of distribution networks acquired from a dispatch schedule of each distribution network operator and a second load at each node in the plurality of distribution networks acquired from a load forecast system of each distribution network, in which the reactive power optimization model includes an objective function and a plurality of constraints, and the plurality of constraints include a plurality of transmission network constraints, a plurality of distribution network constraints and boundary constraints between the transmission network and the plurality of distribution networks; performing a second order cone relaxation on a non-convex constraint of the plurality of distribution network constraints; solving the reactive power optimization model to acquire a first reactive power output of the generator at each node in the transmission network, a second reactive power output of a generator at each node in the plurality of distribution networks, so as to control each generator in the transmission network and each generator in the plurality of distribution networks according to the first reactive power output of the generator at each node in the transmission network, the second reactive power output of a generator at each node in the plurality of distribution networks, so as to optimize the transmission and distribution network.

The technical solutions provided by embodiments of the present disclosure have following advantageous effects.

In the reactive power optimization method, according to embodiments of the present disclosure, a small amount of information is exchanged between the transmission network and the plurality of distribution networks, and the convergence rate is good, also independence between a dispatch and a control in the transmission and distribution network is guaranteed, such that problems such as overvoltage and power mismatch may be solved and an overall network loss may be optimized.

The above summary of the present disclosure is not intended to describe each disclosed embodiment or every implementation of the present disclosure. The Figures and the detailed descriptions which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
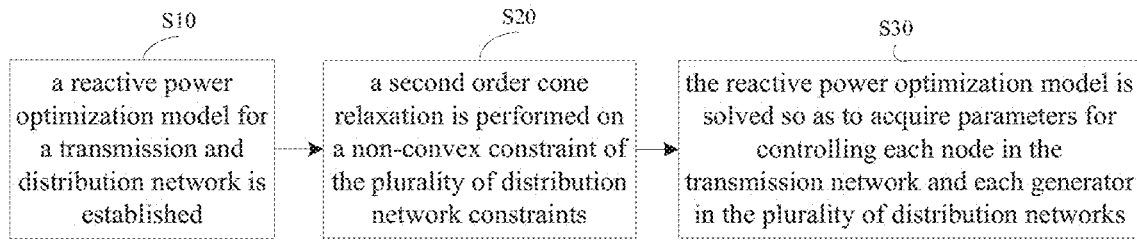
FIG. 1 is a flow chart of a reactive power optimization method according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance. Thus, the feature defined with "first" and "second" may include one or more this feature. In the description of the present disclosure, the term "a plurality of" means two or more than two, unless specified otherwise.

In the following, a reactive power optimization method according to embodiments of the present disclosure will be described in detail with reference to the drawings.

FIG. 1 is a flow chart of a reactive power optimization method according to an embodiment of the present disclosure. As shown in FIG. 1, the reactive power optimization method includes following acts.

In act S10, a reactive power optimization model for a transmission and distribution network consisting of a transmission network and a plurality of distribution networks is established based on a first active power output of a generator at each node in the transmission network acquired from a dispatch schedule of a transmission network operator, a first load at each node in the transmission network acquired from a load forecast system of the transmission network, a second active power output of a generator at each node in the plurality of distribution networks acquired from a dispatch schedule of each distribution network operator and a second load at each node in the plurality of distribution networks acquired from a load forecast system of each distribution network, in which the reactive power optimization model includes an objective function and a plurality of constraints.

1.1) Establishing the Objective Function

Specifically, the objective function is established for minimizing a total network loss of the transmission and distribution network as follows:

$$\min\left(\left(\sum_{i\in I^t}(P_{Gi}^t - P_{Di}^t)\right) + \sum_{k\in DIST}\left(\sum_{i\in I^{d,k}}(P_{Gi}^{d,k} - P_{Di}^{d,k})\right)\right) \quad (1)$$

where $P_{Gi}^t$ represents a first active power output of a generator at an $i^{th}$ node in the transmission network, $P_{Di}^t$ represents a first active load at the $i^{th}$ node in the transmission network, $P_{Gi}^{d,k}$ represents a second active power output of a generator at an $i^{th}$ node in a $k^{th}$ distribution network of the plurality of distribution networks, $P_{Di}^{d,k}$ represents a second active load at the $i^{th}$ node of the $k^{th}$ distribution network of the plurality of distribution networks, $I^t$ represents an index set of nodes in the transmission network, $I^{d,k}$ represents an index set of nodes in the $k^{th}$ distribution network of the plurality of distribution networks, and DIST represents an index set of the plurality of distribution networks.

1.2) Constraints

The plurality of constraints include a plurality of transmission network constraints, a plurality of distribution network constraints and boundary constraints between the transmission network and the plurality of distribution networks.

1.2.1) Transmission Network Constraints

Further, transmission network model may be expressed by power flow equations in polar coordinates, such that the plurality of transmission network constraints include first power flow constraints and first security constraints.

1.2.1.1) First Power Flow Constraints:

$$P_{ij}^t = V_i^t V_j^t (G_{ij}^t \cos\theta_{ij}^t + B_{ij}^t \sin\theta_{ij}^t) \qquad (2)$$

$$Q_{ij}^t = V_i^t V_j^t (G_{ij}^t \sin\theta_{ij}^t - B_{ij}^t \cos\theta_{ij}^t) \qquad (3)$$

$$\sum_{j \in \pi(i)} P_{ij}^t = P_{Gi}^t - P_{Di}^t \qquad (4)$$

$$\sum_{j \in \pi(i)} Q_{ij}^t = Q_{Gi}^t - Q_{Di}^t \qquad (5)$$

where $P_{ij}^t$ represents an active power flow of an $(ij)^{th}$ branch of the transmission network, $Q_{ij}^t$ represents a reactive power flow of the $(ij)^{th}$ branch of the transmission network, $V_i^t$ represents a voltage magnitude at the $i^{th}$ node of the transmission network, $V_j^t$ represents a voltage magnitude at a $j^{th}$ node of the transmission network, $G_{ij}^t$ represents an equivalent conductance of the $(ij)^{th}$ branch of the transmission network, $B_{ij}^t$ represents an equivalent susceptance of the $(ij)^{th}$ branch of the transmission network, $\theta_{ij}^t$ represents a voltage angle difference of the $(ij)^{th}$ branch of the transmission network, $\pi(i)$ represents a set of nodes directly connected to the $i^{th}$ node of the transmission network, $Q_{Gi}^t$ represents a reactive power output of the generator at the $i^{th}$ node of the transmission network, and $Q_{Gi}^t$ represents a reactive load at the $i^{th}$ node of the transmission network.

The formulas (2) and (3) represent an active power flow function and a reactive power flow function in a manner of polar coordinates respectively. The formulas (4) and (5) represent an active power balance and a reactive power balance at each node.

1.2.1.2) First Security Constraints:

$$P_{Gi,min}^t \leq P_{Gi}^t \leq P_{Gi,max}^t \qquad (6)$$

$$Q_{Gi,min}^t \leq Q_{Gi}^t \leq Q_{Gi,max}^t \qquad (7)$$

$$V_{i,min}^t \leq V_i^t \leq V_{i,max}^t \qquad (8)$$

$$(P_{ij}^t)^2 + (Q_{ij}^t)^2 \leq (S_{ij,max}^t)^2 \qquad (9)$$

where $P_{Gi,min}^t$ represents a minimum active power output of the generator at the $i^{th}$ node in the transmission network, $P_{Gi,max}^t$ represents a maximum active power output of the generator at the $i^{th}$ node in the transmission network, $Q_{Gi,min}^t$ represents a minimum reactive power output of the generator at the $i^{th}$ node of the transmission network, $Q_{Gi,max}^t$ represents a maximum reactive power output of the generator at the $i^{th}$ node of the transmission network, $V_{i,min}^t$ represents a minimum voltage magnitude at the $i^{th}$ node of the transmission network, $V_{i,max}^t$ represents a maximum voltage magnitude at the $i^{th}$ node of the transmission network, and $S_{ij,max}^t$ represents a transmission capacity of the $(ij)^{th}$ branch of the transmission network.

The formulas (6) and (7) represent a limit of active power output and a limit of reactive power output of a generator of the transmission network respectively. The formula (8) represents a limit of voltage magnitude at a node of the transmission network and formula (9) represents a limit of transmission capacity of each branch of the transmission network.

1.2.2) Distribution Network Constraints

Additionally, for the radial type distribution networks, the distribution network model may be expressed by branch flow equations, such that the plurality of distribution network constraints include second power flow constraints and second security constraints.

1.2.2.1) Second Power Flow Constraints:

$$(P_{ij}^d)^2 + (Q_{ij}^d)^2 = (I_{ij}^d)^2 (V_i^d)^2 \qquad (10)$$

$$\sum_{i \in u(j)} \left( P_{ij}^d - (I_{ij}^d)^2 r_{ij}^d \right) + P_{Gj}^d = \sum_{k \in v(j)} (P_{jk}^d) + P_{Dj}^d \qquad (11)$$

$$\sum_{i \in u(j)} \left( Q_{ij}^d - (I_{ij}^d)^2 x_{ij}^d \right) + Q_{Gj}^d = \sum_{k \in v(j)} (Q_{jk}^d) + Q_{Dj}^d \qquad (12)$$

$$(V_j^d)^2 = (V_i^d)^2 - 2(r_{ij}^d P_{ij}^d + x_{ij}^d Q_{ij}^d) + \left((r_{ij}^d)^2 + (x_{ij}^d)^2\right)(I_{ij}^d)^2 \qquad (13)$$

where $P_{ij}^d$ represents an active power flow of an $(ij)^{th}$ branch of the plurality of distribution networks, $Q_{ij}^d$ represents a reactive power flow of the $(ij)^{th}$ branch of the plurality of distribution networks, $I_{ij}^d$ represents a current magnitude of the $(ij)^{th}$ branch of the plurality of distribution network, $V_i^d$ represents the voltage magnitude at an $i^{th}$ node of the plurality of distribution networks, $r_{ij}^d$ represents a resistance of the $(ij)^{th}$ branch of the plurality of distribution networks, $x_{ij}^d$ represents a reactance of the $(ij)^{th}$ branch of the plurality of distribution networks, $u(j)$ represents a set of parent nodes of a $j^{th}$ node of the plurality of distribution networks, $v(j)$ represents a set of parent nodes of a $j^{th}$ node of the plurality of distribution networks, $P_{Gj}^d$ represents an active power output of a generator at the $j^{th}$ node of the plurality of distribution networks, $P_{Dj}^d$ represents an active load at the $j^{th}$ node of the plurality of distribution networks, $Q_{Gj}^d$ represents a reactive power output of the generator at the $j^{th}$ node of the plurality of distribution networks, $Q_{Dj}^d$ represents a reactive load at the $j^{th}$ node of the plurality of distribution networks, $P_{jk}^d$ represents an active power flow in a $(jk)^{th}$ branch of the plurality of distribution networks, and $Q_{jk}^d$ represents a reactive power flow in the $(jk)^{th}$ branch of the plurality of distribution networks.

In the radial type distribution networks, formulas (10)-(13) are derived from the power flow equations in polar coordinates.

1.2.2.2) Second Security Constraints:

$$P_{Gi,min}^d \leq P_{Gi}^d \leq P_{Gi,max}^d \qquad (14)$$

$$Q_{Gi,min}^d \leq Q_{Gi}^d \leq Q_{Gi,max}^d \qquad (15)$$

$$V_{i,min}^d \leq V_i^d \leq V_{i,max}^d \qquad (16)$$

$$I_{ij}^d \leq I_{ij,max}^d \qquad (17)$$

where $P_{Gi}^d$ represents an active power output of a generator at the $i^{th}$ node of the plurality of distribution networks, $P_{Gi,min}^d$ represents a minimum active power output of the generator at the $i^{th}$ node of the plurality of distribution networks, $P_{Gi,max}^d$ represents a maximum active power output of the generator at the $i^{th}$ node of the plurality of distribution networks, $Q_{Gi}^d$ represents a reactive power output of the generator at the $i^{th}$ node of the plurality of distribution networks, $Q_{Gi,min}^d$ represents a minimum reactive power output of the generator at the $i^t h$ node of the plurality of distribution networks, $Q_{Gi,max}^d$ represents a maximum reactive power output of the generator at the $i^{th}$ node of the plurality of distribution networks, $V_i^d$ represents a voltage magnitude at the $i^{th}$ node of the plurality of distribution networks, $V_{i,min}^d$ represents a minimum voltage magnitude at the $i^{th}$ node of the plurality of distribution networks, $V_{i,max}^d$ represents a maximum voltage magnitude at the $i^{th}$ node of the plurality of distribution networks, $I_{ij}^d$ represents a current magnitude of the $(ij)^{th}$ branch of the plurality of distribution networks, and $I_{ij,max}^d$ represents an upper limit of the current magnitude of the $(ij)^{th}$ branch of the plurality of distribution networks.

Formulas (14) and (15) represent a limit of active power output and a limit of reactive power output of a generator of the distrbitution networks respectively. The formula (16) represents a limit of voltage magnitude at a node of the distrbitution networks and formula (17) represents a limit of transmission capacity of each branch of the distrbitution networks.

1.2.3) Boundary Constraints

Additionally, the boundary constraints are configured to ensure a balance between active power and reactive power of the transmission and distribution network, and to ensure an equivalence of the voltage magnitudes of the transmission network and the distribution networks, in which the boundary constraints are represented as:

$$V_{\tau(k)}^t = V_{root}^{d,k} \quad (18)$$

$$P_{\tau(k)}^t = P_{root}^{d,k} \quad (19)$$

$$Q_{\tau(k)}^t = Q_{root}^{d,k} \quad (20)$$

where $V_{\tau(k)}^t$ represents a voltage magnitude at a node in the transmission network connected to the $k^{th}$ distribution network, $V_{root}^{d,k}$ represents a voltage magnitude at a root node of the $k^{th}$ distribution network, $P_{\tau(k)}^t$ represents an equivalent active load of the $k^{th}$ distribution network in the transmission network, $P_{root}^{d,k}$ represents an active power injection from the transmission network to the root node of the $k^{th}$ distribution network, $Q_{\tau(k)}^t$ represents an equivalent reactive load of the $k^{th}$ distribution network in the transmission network, and $Q_{root}^{d,k}$ represents an reactive power injection from the transmission network to the root node of the $k^{th}$ distribution network.

In act S20, a second order cone relaxation is performed on a non-convex constraint of the plurality of distribution network constraints.

Since the sub problem is required to be convex so as to ensure the convergence when adopting the generalized Benders decomposition method, a second order cone relaxation is needed to be performed on the distribution network constraints.

Firstly, a first variable $L_{ij}^d$ and a second variable $U_i^d$ are introduced as follows:

$$L_{ij}^d = (I_{ij}^d)^2 \quad (21)$$

$$U_i^d = (V_i^d)^2 \quad (22)$$

$L_{ij}^d$ and $U_i^d$ represent a square of current magnitude and a square of voltage magnitude respectively.

The second power flow constraints are represented as follows:

$$(P_{ij}^d)^2 + (Q_{ij}^d)^2 = L_{ij}^d U_i^d \quad (23)$$

$$\sum_{i \in u(j)} (P_{ij}^d - L_{ij}^d r_{ij}^d) + P_{Gj}^d = \sum_{k \in v(j)} (P_{jk}^d) + P_{Dj}^d \quad (24)$$

$$\sum_{i \in u(j)} (Q_{ij}^d - L_{ij}^d x_{ij}^d) + Q_{Gj}^d = \sum_{k \in v(j)} (Q_{jk}^d) + Q_{Dj}^d \quad (25)$$

$$U_j^d = U_i^d - 2(r_{ij}^d P_{ij}^d + x_{ij}^d Q_{ij}^d) + ((r_{ij}^d)^2 + (x_{ij}^d)^2) L_{ij}^d \quad (26)$$

Formula (16) in the second security constraints is represented as follow:

$$(V_{i,min}^d)^2 \le U_i^d \le (V_{i,max}^d)^2 \quad (27)$$

A relaxation is performed on formula (23) so as to acquire a formula of:

$$(P_{ij}^d)^2 \le (Q_{ij}^d)^2 \le L_{ij}^d U_i^d)^2 \quad (28)$$

The formula (28) is represented in a format of standard second order cone constraint as follow:

$$\left\| \begin{array}{c} 2P_{ij}^d \\ 2Q_{ij}^d \\ L_{ij}^d - U_i^d \end{array} \right\|_2 \le L_{ij}^d + U_i^d \quad (29)$$

Since the stringency of relaxation is ensured only when there is no upper limit for the voltage magnitude of each node, there may be an error in the relaxation generally. However, since only voltage magnitudes of a few nodes reach the upper limit, the error is small.

Figure 2:
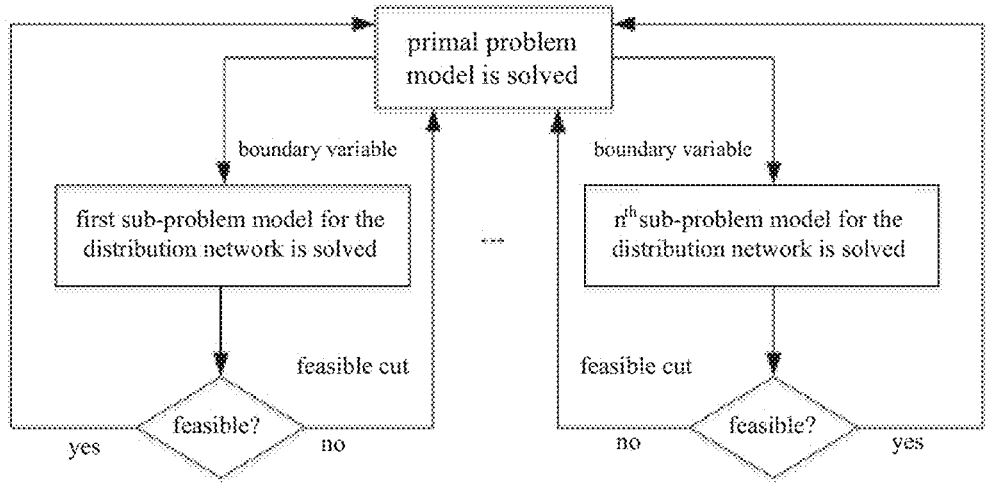
FIG. 2 is a flow chart of a process for solving a model solving algorithm according to an embodiment of the present disclosure.
Figure 3:
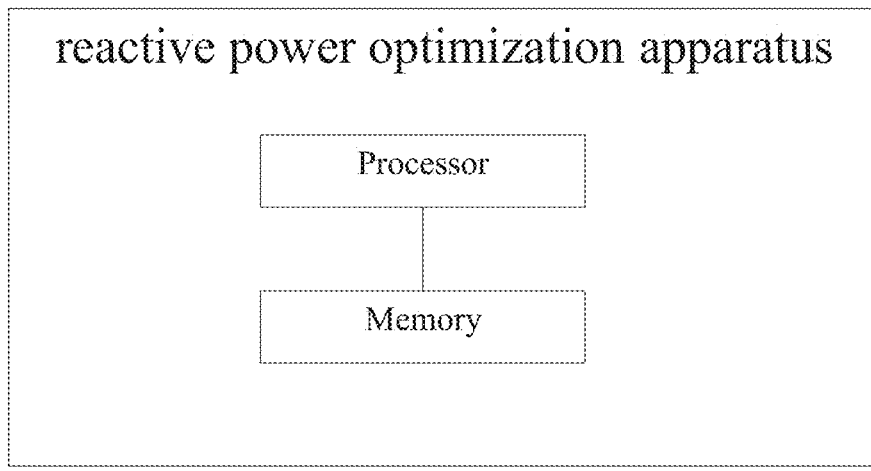
FIG. 3 is a block diagram of a reactive power optimization apparatus according to an embodiment of the present disclosure.

In act S30, the reactive power optimization model is solved to acquire a first reactive power output of the generator at each node in the transmission network, a second reactive power output of a generator at each node in the plurality of distribution networks, so as to control each node in the transmission network and each generator in the plurality of distribution networks according to the first reactive power output of the generator at each node in the transmission network, the second reactive power output of a generator at each node in the plurality of distribution networks, so as to optimize the transmission and distribution network. A process for solving the reactive power optimization model is shown in FIG. 2.

Specifically, the reactive power optimization model is solved by using a generalized Benders decomposition method, and the reactive power optimization method further includes following acts.

3.1) an initial iteration times q is set as 0.

3.2) a primal problem model and a plurality of sub-problem models are established by decomposing the reactive power optimization model based on the generalized Benders decomposition method.

The primal problem model is a first separate reactive power optimization model for the transmission network with a boundary variable feasible cut constraint, in which the primal problem model is represented as formula (30) and an optimal solution of the primal problem model is ŷ:

$$\min_{y \in Y} P_{G,ref}^t \quad (30)$$

$$\text{s.t. } L_*(y, \lambda^j) \le 0, \, j = 1, 2, \ldots, q$$

where y represents a vector of all variables of the transmission network, Y represents a set of all the transmission network constraints, $P_{G,ref}^t$ is an active power output of a generator at a reference node of the transmission network, $\lambda^j$ is a multiplier, L* is a function representing the feasible cut.

Each sub-problem model is a second separate reactive power optimization model for the plurality of distribution networks with a given boundary variable, the sub-problem model for the $k^{th}$ distribution network is represented as formula (31):

$$\min_{x_k} f_k(x_k, \hat{y}) \tag{31}$$

$$\text{s.t. } H_k(x_k, \hat{y}) = 0$$

$$x_k \in X_k$$

where $x_k$ represents a vector of variables of the $k^{th}$ distribution network, $\hat{y}$ represents a solution obtained from (30), $f_k$ represents a function of network loss of the $k^{th}$ distribution network, $H_k(x_k,\hat{y})=0$ are a vector of boundary constraints between the transmission network and the $k^{th}$ distribution network, $X_k$ is a set of all constraints of the $k^{th}$ distribution network.

3.3) the primal problem model is solved by the transmission network operator and the plurality of sub-problem models are solved by the plurality of distribution network operators respectively.

3.4) it is judged that an iteration for solving the reactive power optimization model is convergent if all of the plurality of sub-problem models are feasible, and the iteration is stopped; a feasible cut for each infeasible sub-problem model is generated if there is at least one infeasible sub-problem model, and a next iteration is performed by solving the primal problem model by the transmission network operator and the plurality of sub-problem models are solved undergoing the feasible cut by the plurality of distribution network operators respectively again.

Specifically, a feasible cut for at least one infeasible sub-problem model is generated in act S34, which further includes following acts.

3.4.1) the sub-problem model satisfying a relaxed boundary constraint is generated as follows:

$$\min_{x_k \in X_k} \sum_{i=1}^{6} \alpha_i \tag{32}$$

$$\text{s.t. } P_{root}^{d,k} - \hat{P}_{\tau(k)}^{t} \le \alpha_1, -P_{root}^{d,k} + \hat{P}_{\tau(k)}^{t} \le \alpha_2$$

$$Q_{root}^{d,k} - \hat{Q}_{\tau(k)}^{t} \le \alpha_3, -Q_{root}^{d,k} + \hat{Q}_{\tau(k)}^{t} \le \alpha_4$$

$$U_{root}^{d,k} - (\hat{V}_{\tau(k)}^{t})^2 \le \alpha_5, -U_{root}^{d,k} + (\hat{V}_{\tau(k)}^{t})^2 \le \alpha_6$$

$$\alpha_i \ge 0, i = 1, 2, \ldots, 6$$

where $\hat{P}_{\tau(k)}^{t}$, $\hat{Q}_{\tau(k)}^{t}$ and $\hat{V}_{\tau(k)}^{t}$ represent variables transferred from the primal problem model;

3.4.2) the sub-problem model satisfying the relaxed boundary constraint is solved, in which Lagrangian multipliers in formula (32) are $\lambda_1 \sim \lambda_6$ corresponding to inequations whose right sides are $\alpha_1 \sim \alpha_6$;

Variables $\lambda_P$, $\lambda_Q$ and $\lambda_V$ are introduced as follows:

$$\lambda_P = \lambda_1 - \lambda_2$$

$$\lambda_Q = \lambda_3 - \lambda_4$$

$$\lambda_V = \lambda_5 - \lambda_6 \tag{33}$$

3.4.3) The Feasible Cut is Generated:

$$L_*(y, \hat{\lambda}) = \inf_{x \in X} \{\hat{\lambda}^T H(x, y)\}, y \in Y \tag{34}$$

$$= \inf_{x \in X} \left\{ \begin{array}{c} \lambda_P(P_{root}^{d,k} - P_{\tau(k)}^{t}) + \lambda_Q(Q_{root}^{d,k} - Q_{\tau(k)}^{t}) + \\ \lambda_V(U_{root}^{d,k} - (V_{\tau(k)}^{t})^2) \end{array} \right\}, y \in Y$$

$$= \inf_{x \in X} \{\lambda_P P_{root}^{d,k} + \lambda_Q Q_{root}^{d,k} + \lambda_V U_{root}^{d,k}\} -$$

$$(\lambda_P P_{\tau(k)}^{t} + \lambda_Q Q_{\tau(k)}^{t} + \lambda_V (V_{\tau(k)}^{t})^2), y \in Y$$

Formula (34) is simplified to a formula of $$\lambda_P P_{\tau(k)}^{t} + \lambda_Q Q_{\tau(k)}^{t} + \lambda_V (V_{\tau(k)}^{t})^2 \ge \lambda_{val} \tag{35}$$

where $$\lambda_{val} = \inf_{x \in X} \{\lambda_P P_{root}^{d,k} + \lambda_Q Q_{root}^{d,k} + \lambda_V U_{root}^{d,k}\} \tag{36}$$

The feasible cut of formula (35) is represented as follows:

$$L_*(y, \hat{\lambda}) = \inf_{x_k \in X_k} \{\hat{\lambda}^T H(x_k, y)\}, y \in Y \tag{37}$$

Let $q=q+1$ and $\lambda^q = \lambda$, and return to step 3.2).

The technical solutions provided by embodiments of the present disclosure have following advantageous effects.

In the reactive power optimization method according to embodiments of the present disclosure, a small amount of information is exchanged between the transmission network and the plurality of distribution networks, and the convergence rate is good, also independence between a dispatch and a control in the transmission and distribution network, is guaranteed such that problems such as overvoltage and power mismatch loss may be solved and an overall network loss may be optimized.

In the following, a reactive power optimization apparatus according to embodiments of the present disclosure will be described in detail with reference to the drawings.

In the embodiments of the present disclosure, the optimal control apparatus includes a processor; a memory configured to store an instruction executable by the processor, in which the processor is configured to:

establish a reactive power optimization model for a transmission and distribution network consisting of a transmission network and a plurality of distribution networks based on a first active power output of a generator at each node in the transmission network acquired from a dispatch schedule of a transmission network operator, a first load at each node in the transmission network acquired from a load forecast system of the transmission network, a second active power output of a generator at each node in the plurality of distribution networks acquired from a dispatch schedule of each distribution network operator and a second load at each node in the plurality of distribution networks acquired from a load forecast system of each distribution network, in which the reactive power optimization model includes an objective function and a plurality of constraints, and the plurality of constraints include a plurality of transmission network constraints, a plurality of distribution network constraints and a boundary constraint between the transmission network and the plurality of distribution networks;

perform a second order cone relaxation on a non-convex constraint of the plurality of distribution network constraints;

solve the reactive power optimization model to acquire a first reactive power output of the generator at each node in the transmission network, a second reactive power output of a generator at each node in the plurality of distribution networks so as to control each generator in the transmission network and each generator in the plurality of distribution networks according to the first reactive power output of the generator at each node in the transmission network, the second reactive power output of a generator at each node in the plurality of distribution networks, so as to optimize the transmission and distribution network.

In embodiments of the present disclosure, the objective function is established for minimizing a total network loss of the transmission and distribution network as follows:

$$\min\left(\left(\sum_{i\in I^t}(P_{Gi}^t-P_{Di}^t)\right)+\sum_{k\in DIST}\left(\sum_{i\in I^{d,k}}(P_{Gi}^{d,k}-P_{Di}^{d,k})\right)\right) \quad (1)$$

where $P_{Gi}^t$ represents a first active power output of a generator at an $i^{th}$ node in the transmission network, $P_{Di}^t$ represents a first active load at the $i^{th}$ node in the transmission network, $P_{Gi}^t$ represents a second active power output of a generator at an $i^{th}$ node in a $k^{th}$ distribution network of the plurality of distribution networks, $P_{Di}^t$ represents a second active load at the $i^{th}$ node in the $k^{th}$ distribution network of the plurality of distribution networks, $I^t$ represents an index set of nodes in the transmission network, $I^{d,k}$ represents an index set of nodes in the $k^{th}$ distribution network of the plurality of distribution networks, $I^{d,k}$ and DIST represents an index set of the plurality of distribution networks.

In the embodiments of the present disclosure, the plurality of transmission network constraints include first power flow constraints and first security constraints, in which the first power flow constraints are represented as:

$$P_{ij}^t = V_i^t V_j^t (G_{ij}^t \cos\theta_{ij}^t + B_{ij}^t \sin\theta_{ij}^t) \quad (2)$$

$$Q_{ij}^t = V_i^t V_j^t (G_{ij}^t \sin\theta_{ij}^t - B_{ij}^t \cos\theta_{ij}^t) \quad (3)$$

$$\sum_{j\in\pi(i)} P_{ij}^t = P_{Gi}^t - P_{Di}^t \quad (4)$$

$$\sum_{j\in\pi(i)} Q_{ij}^t = Q_{Gi}^t - Q_{Di}^t \quad (5)$$

where $P_{ij}^t$ represents an active power flow in an $(ij)^{th}$ branch in the transmission network, $Q_{ij}^t$ represents a reactive power flow in the $(ij)^{th}$ branch in the transmission network, $V_i^t$ represents a voltage magnitude at the $i^{th}$ node in the transmission network, $V_j^t$ represents the voltage magnitude at a $j^{th}$ node in the transmission network, $G_{ij}^t$ represents an equivalent conductance in the $(ij)^{th}$ branch in the transmission network, $B_{ij}^t$ represents an equivalent susceptance in the $(ij)^{th}$ branch in the transmission network, $\theta_{ij}^t$ represents a voltage angle difference of the $(ij)^{th}$ branch in the transmission network, $\pi(i)$ represents a set of nodes directly connected to the $i^{th}$ node in the transmission network, $Q_{Gi}^t$ represents a reactive power input of the generator at the $i^{th}$ node in the transmission network, and $Q_{Di}^t$ represents a reactive load at the $i^{th}$ node in the transmission network.

In the embodiments of the present disclosure, the first security constraints are represented as:

$$P_{Gi,min}^t \le P_{Gi}^t \le P_{Gi,max}^t \quad (6)$$

$$Q_{Gi,min}^t \le Q_{Gi}^t \le Q_{Gi,max}^t \quad (7)$$

$$V_{i,min}^t \le V_i^t \le V_{i,max}^t \quad (8)$$

$$(P_{ij}^t)^2 + (Q_{ij}^t)^2 \le (S_{ij,max}^t)^2 \quad (9)$$

where $P_{Gi,min}^t$ represents a minimum active power output of the generator at the $i^{th}$ node in the transmission network, $P_{Gi,max}^t$ represents a maximum active power output of the generator at the $i^{th}$ node in the transmission network, $Q_{Gi,min}^t$ represents a minimum reactive power output of the generator at the $i^{th}$ node of the transmission network, $Q_{Gi,max}^t$ represents a maximum reactive power output of the generator at the $i^{th}$ node of the transmission network, $V_{i,min}^t$ represents a minimum voltage magnitude at the $i^{th}$ node of the transmission network, $V_{i,max}^t$ represents a maximum voltage magnitude at the $i^{th}$ node of the transmission network, and $S_{ij,max}^t$ represents a transmission capacity of the $(ij)^{th}$ branch of the transmission network.

In the embodiments of the present disclosure, the plurality of distribution network constraints include second power flow constraints and second security constraints, in which the second power flow constraints are represented as:

$$(P_{ij}^d)^2 + (Q_{ij}^d)^2 = (I_{ij}^d)^2 (V_i^d)^2 \quad (10)$$

$$\sum_{i\in u(j)}(P_{ij}^d - (I_{ij}^d)^2 r_{ij}^d) + P_{Gj}^d = \sum_{k\in v(j)}(P_{jk}^d) + P_{Dj}^d \quad (11)$$

$$\sum_{i\in u(j)}(Q_{ij}^d - (I_{ij}^d)^2 x_{ij}^d) + Q_{Gj}^d = \sum_{k\in v(j)}(Q_{jk}^d) + Q_{Dj}^d \quad (12)$$

$$(V_j^d)^2 = (V_i^d)^2 - 2(r_{ij}^d P_{ij}^d + x_{ij}^d Q_{ij}^d) + ((r_{ij}^d)^2 + (x_{ij}^d)^2)(I_{ij}^d)^2 \quad (13)$$

where $P_{ij}^d$ represents an active power flow of an $(ij)^{th}$ branch of the plurality of distribution networks, $Q_{ij}^d$ represents a reactive power flow of the $(ij)^{th}$ branch of the plurality of distribution networks, $I_{ij}^d$ represents a current magnitude of the $(ij)^{th}$ branch of the plurality of distribution network, $V_i^d$ represents the voltage magnitude at the $i^{th}$ node of the plurality of distribution networks, $r_{ij}^d$ represents a resistance of the $(ij)^{th}$ branch of the plurality of distribution networks, $x_{ij}^d$ represents a reactance of the $(ij)^{th}$ branch of the plurality of distribution networks, u(j) represents a set of parent nodes of a $j^{th}$ node of the plurality of distribution networks, v(j) represents a set of parent nodes of a $j^{th}$ node of the plurality of distribution networks, $P_{Gj}^d$ represents the set of child nodes of the $j^{th}$ node of the plurality of distribution networks, $P_{Dj}^d$ represents an active power output of a generator at the $j^{th}$ node of the plurality of distribution networks, $P_{Dj}^d$ represents an active load at the $j^{th}$ node of the plurality of distribution networks, $Q_{Gj}^d$ represents a reactive power output of the generator at the $j^{th}$ node of the plurality of distribution networks, $Q_{Dj}^d$ represents a reactive load at the $j^{th}$ node of the plurality of distribution networks, $P_{jk}^d$ represents an active power flow in a $(jk)^{th}$ branch of the plurality of distribution networks, and $Q_{jk}^d$ represents a reactive power flow in the $(jk)^{th}$ branch of the plurality of distribution networks.

In the embodiments of the present disclosure, the second security constraints are represented as:

$$P_{Gi,min}^d \le P_{Gi}^d \le P_{Gi,max}^d \quad (14)$$

$$Q_{Gi,min}^d \le Q_{Gi}^d \le Q_{Gi,max}^d \quad (15)$$

$$V_{i,min}{}^d \leq V_i^d \leq V_{i,max}{}^d \tag{16}$$

$$I_{ij}{}^d \leq I_{ij,max}{}^d \tag{17}$$

where $P_{Gi}{}^d$ represents an active power output of a generator at the $i^{th}$ node of the plurality of distribution networks, $P_{Gi,min}{}^d$ represents a minimum active power output of the generator at the $i^{th}$ node of the plurality of distribution networks, $P_{Gi,max}{}^d$ represents a maximum active power output of the generator at the $i^{th}$ node in the plurality of distribution networks, $Q_{Gi}{}^d$ power output of the generator at the $i^{th}$ node in the plurality of distribution networks, represents a reactive power output of the generator at the $i^{th}$ node in the plurality of distribution networks, $Q_{Gi,min}{}^d$ represents a minimum reactive power output of the generator at the $i^{th}$ node of the plurality of distribution networks, $Q_{Gi,max}{}^d$ represents a maximum reactive power output of the generator at the $i^{th}$ node of the plurality of distribution networks, $V_i^d$ represents a voltage magnitude at the $i^{th}$ node of the plurality of distribution networks, $V_{i,min}{}^d$ represents a minimum voltage magnitude at the $i^{th}$ node of the plurality of distribution networks, $V_{i,max}{}^d$ represents a maximum voltage magnitude at the $i^{th}$ node of the plurality of distribution networks, $I_{ij}{}^d$ represents a current magnitude of the $(ij)^{th}$ branch of the plurality of distribution networks, and $I_{ij,max}{}^d$ represents an upper limit of the current magnitude of the $(ij)^{th}$ branch of the plurality of distribution networks.

In the embodiments of the present disclosure, the boundary constraints are represented as:

$$V_{\tau(k)}{}^t = V_{root}{}^{d,k} \tag{18}$$

$$P_{\tau(k)}{}^t = P_{root}{}^{d,k} \tag{19}$$

$$Q_{\tau(k)}{}^t = Q_{root}{}^{d,k} \tag{20}$$

where $V_{\tau(k)}{}^t$ represents a voltage magnitude at a node in the transmission network connected to the $k^{th}$ distribution network, $V_{root}{}^{d,k}$ represents a voltage magnitude at a root node of the $k^{th}$ distribution network, $P_{\tau(k)}{}^t$ represents an equivalent active load of the $k^{th}$ distribution network in the transmission network, $P_{root}{}^{d,k}$ represents an active power injection from the transmission network to the root node of the $k^{th}$ distribution network, $Q_{\tau(k)}{}^t$ represents an equivalent reactive load of the $k^{th}$ distribution network in the transmission network, and $Q_{root}{}^{d,k}$ represents an reactive power injection from the transmission network to the root node of the $k^{th}$ distribution network.

In the embodiments of the present disclosure, the processor is further configured to: introduce a first variable $L_{ij}{}^d$ and a second variable $U_i^d$ as follows:

$$L_{ij}{}^d = (I_{ij}{}^d)^2 \tag{21}$$

$$U_i^d = (V_i^d)^2 \tag{22}$$

simplify the second power flow constraints using the first variable $L_{ij}{}^d$ and the second variable $U_i^d$ as follows:

$$(P_{ij}^d)^2 + (Q_{ij}^d)^2 = L_{ij}^d U_i^d \tag{23}$$

$$\sum_{i \in u(j)} (P_{ij}^d - L_{ij}^d r_{ij}^d) + P_{Gj}^d = \sum_{k \in v(j)} (P_{jk}^d) + P_{Dj}^d \tag{24}$$

$$\sum_{i \in u(j)} (Q_{ij}^d - L_{ij}^d x_{ij}^d) + Q_{Gj}^d = \sum_{k \in v(j)} (Q_{jk}^d) + Q_{Dj}^d \tag{25}$$

$$U_j^d = U_i^d - 2(r_{ij}^d P_{ij}^d + x_{ij}^d Q_{ij}^d) + ((r_{ij}^d)^2 + (x_{ij}^d)^2) L_{ij}^d \tag{26}$$

transform formula (16) in the second security constraints to formula (27) using the second variable $U_i^d$:

$$(V_{i,min}{}^d)^2 \leq U_i^d \leq (V_{i,max}{}^d)^2 \tag{27}$$

perform a relaxation on formula (23) so as to acquire a formula of:

$$(P_{ij}^d)^2 \leq (P_{ij}^d)^2 \leq L_{ij}^d U_i^d)^2 \tag{28}$$

represent the formula (28) in a format of standard second order cone constraints as follow:

$$\left\| \begin{array}{c} 2P_{ij}^d \\ 2Q_{ij}^d \\ L_{ij}^d - U_i^d \end{array} \right\|_2 \leq L_{ij}^d + U_i^d \tag{29}$$

In the embodiments of the present disclosure, the reactive power optimization model is solved by using a generalized Benders decomposition method, and the processor is further configured to:

set an initial iteration times q=0;

establish a primal problem model and a plurality of sub-problem models solved by decomposing the reactive power optimization model based on the generalized Benders decomposition method;

solve the primal problem model by the transmission network operator and the plurality of sub-problem models by the plurality of distribution network operators respectively;

judge that an iteration for solving the reactive power optimization model is convergent if all of the plurality of sub-problem models are feasible, and stop the iteration; generate a feasible cut for each infeasible sub-problem model if there is at least one infeasible sub-problem model, and perform a next iteration by solving the primal problem model by the transmission network operator and the plurality of sub-problem models undergoing the feasible cut and by the plurality of distribution network operators respectively again.

In the embodiments of the present disclosure, the primal problem model is represented as formula (30) and an optimal solution of the primal problem model is $\hat{y}$:

$$\min_{y \in Y} P_{G,ref}^t \tag{30}$$

$$\text{s.t.} \ L_*(y, \lambda^j) \leq 0, \ j = 1, 2, \ldots, q$$

where y represents a vector of all variables of the transmission network, Y represents a set of all the transmission network constraints, $P_{G,ref}{}^t$ is an active power output of a generator at a reference node of the transmission network, $\lambda^j$ is a multiplier, L* is a function representing the feasible cut.

In the embodiments of the present disclosure, the sub-problem model for the $k^{th}$ distribution network is represented as formula (31):

$$\min_{x_k} f_k(x_k, \hat{y}) \tag{31}$$

$$\text{s.t.} \ H_k(x_k, \hat{y}) = 0$$

$$x_k \in X_k$$

where $x_k$ represents a vector of variables of the $k^{th}$ distribution network, $\hat{y}$ represents a solution obtained from (30), $f_k$ represents a function of network loss of the $k^{th}$ distribution network, $H_k(x_k,\hat{y})=0$ are a vector of boundary constraints between the transmission network and the $k^{th}$ distribution network, $X_k$ is a set of all constraints of the $k^{th}$ distribution network.

In the embodiments of the present disclosure, the processor is further configured to: generate the sub-problem model satisfying a relaxed boundary constraint as follows:

$$\min_{s_k \in X_k} \sum_{i=1}^{6} \alpha_i \tag{32}$$

$$\text{s.t. } P_{root}^{d,k} - \hat{P}_{\tau(k)}^{t} \le \alpha_1, -P_{root}^{d,k} + \hat{P}_{\tau(k)}^{t} \le \alpha_2$$

$$Q_{root}^{d,k} - \hat{Q}_{\tau(k)}^{t} \le \alpha_3, -Q_{root}^{d,k} + \hat{Q}_{\tau(k)}^{t} \le \alpha_4$$

$$U_{root}^{d,k} - (\hat{V}_{\tau(k)}^{t})^2 \le \alpha_5, -U_{root}^{d,k} + (V_{\tau(k)}^{t})^2 \le \alpha_6$$

$$\alpha_i \ge 0, i = 1, 2, \ldots, 6$$

where $\hat{P}_{\tau(k)}^{t}$, $\hat{Q}_{\tau(k)}^{t}$ and $\hat{V}_{\tau(k)}^{t}$ represent variables transferred from the primal problem model, $U_{root}^{d,k}$ is a square of $V_{root}^{d,k}$ in (18), $\alpha_1 \sim \alpha_6$ are relaxation terms;

solve the sub-problem model satisfying the relaxed boundary constraint, in which Lagrangian multipliers in formula (32) are $\lambda_1 \sim \lambda_6$ corresponding to inequations whose right sides are $\alpha_1$ introduce variables $\lambda_P$, $\lambda_Q$ and $\lambda_V$ as follows:

$$\lambda_P = \lambda_1 - \lambda_2$$

$$\lambda_Q = \lambda_3 - \lambda_4$$

$$\lambda_V = \lambda_5 - \lambda_6 \tag{33}$$

generate the feasible cut:

$$L_*(y,\hat{\lambda}) = \inf_{x \in X}\{\hat{\lambda}^T H(x,y)\}, y \in Y \tag{34}$$

$$= \inf_{x \in X}\left\{\begin{array}{c}\lambda_P(P_{root}^{d,k} - P_{\tau(k)}^{t}) + \lambda_Q(Q_{root}^{d,k} - Q_{\tau(k)}^{t}) + \\ \lambda_V(U_{root}^{d,k} - (V_{\tau(k)}^{t})^2)\end{array}\right\}, y \in Y$$

$$= \inf_{x \in X}\{\lambda_P P_{root}^{d,k} + \lambda_Q Q_{root}^{d,k} + \lambda_V U_{root}^{d,k}\} -$$

$$(\lambda_P P_{\tau(k)}^{t} + \lambda_Q Q_{\tau(k)}^{t} + \lambda_V (V_{\tau(k)}^{t})^2), y \in Y$$

simplify formula (34) to a formula of $$\lambda_P P_{\tau(k)}^{t} + \lambda_Q Q_{\tau(k)}^{t} + \lambda_V (V_{\tau(k)}^{t})^2 \ge \lambda_{val} \text{ where} \tag{35}$$

$$\lambda_{val} = \inf_{x \in X}\{\lambda_P P_{root}^{d,k} + \lambda_Q Q_{root}^{d,k} + \lambda_V U_{root}^{d,k}\} \tag{36}$$

represent the feasible cut of formula (35) as follows:

$$L_*(y,\hat{\lambda}) = \inf_{x_k \in X_k}\{\hat{\lambda}^T H(x_k,y)\}, y \in Y \tag{37}$$

add one on q and set $\lambda^q = \hat{\lambda}$.

The technical solutions provided by embodiments of the present disclosure have following advantageous effects.

In the reactive power optimization apparatus, according to embodiments of the present disclosure, a little information is exchanged between the transmission network and the plurality of distribution networks, which has a better convergence rate and ensure independence between a dispatch and a control in the transmission and distribution network, such that problems such as overvoltage and power mismatch may be solved and an overall network loss may be optimized.

In the following, a non-transitory computer-readable storage medium according to embodiments of the present disclosure will be described in detail.

In the embodiments of the present disclosure, the non-transitory computer-readable storage medium having stored therein instructions that, when executed by a processor of a terminal, causes the terminal to perform a reactive power optimization method according to the above embodiments of the present disclosure for running an application program.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in an almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The non-transitory computer-readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "In the embodiments of the present disclosure," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A reactive power optimization method, comprising:
establishing a reactive power optimization model for an integrated network consisting of a transmission network and a plurality of distribution networks based on a first active power output of a generator at each node in the transmission network acquired from a dispatch schedule of a transmission network operator, a first load at each node in the transmission network acquired from a load forecast system of the transmission network, a second active power output of a generator at each node in the plurality of distribution networks acquired from a dispatch schedule of each distribution network operator and a second load at each node in the plurality of distribution networks acquired from a load forecast system of each distribution network, wherein the reactive power optimization model comprises an objective function and a plurality of constraints, and the plurality of constraints include a plurality of transmission network constraints, a plurality of distribution network constraints and boundary constraints between the transmission network and the plurality of distribution networks, wherein, the plurality of transmission network constraints comprise first power flow constraints and first security constraints, wherein the first power flow constraints are represented as:

$$P_{ij}^t = V_i^t V_j^t (G_{ij}^t \cos\theta_{ij}^t + B_{ij}^2 \sin\theta_{ij}^t) \quad (2)$$

$$Q_{ij}^t = V_i^t V_j^t (G_{ij}^t \sin\theta_{ij}^t - B_{ij}^2 \cos\theta_{ij}^t) \quad (3)$$

$$\sum_{j \in \pi(i)} P_{ij}^t = P_{Gi}^t - P_{Di}^t \quad (4)$$

$$\sum_{j \in \pi(i)} Q_{ij}^t = Q_{Gi}^t - Q_{Di}^t \quad (5)$$

where $P_{ij}^t$ represents an active power flow of an $(ij)^{th}$ branch of the transmission network, $Q_{ij}^t$ represents a reactive power flow of the $(ij)^{th}$ branch of the transmission network, $V_i^t$ represents a voltage magnitude at the $i^{th}$ node of the transmission network, $V_j^t$ represents a voltage magnitude at a $j^{th}$ node of the transmission network, $G_{ij}^t$ represents an equivalent conductance of the $(ij)^{th}$ branch of the transmission network, $B_{ij}^t$ represents an equivalent susceptance of the $(ij)^{th}$ branch of the transmission network, $\theta_{ij}^t$ represents a voltage angle difference of the $(ij)^{th}$ branch of the transmission network, $\pi(i)$ represents a set of nodes directly connected to the $i^{th}$ node of the transmission network, $Q_{Gi}^t$ represents a reactive power output of the generator at the $i^{th}$ node of the transmission network, and $Q_{Di}^t$ represents a reactive load at the $i^{th}$ node of the transmission network; and the first security constraints are represented as:

$$P_{Gi,min}^t \leq P_{Gi}^t \leq P_{Gi,max}^t \quad (6)$$

$$Q_{Gi,min}^t \leq Q_{Gi}^t \leq Q_{Gi,max}^t \quad (7)$$

$$V_{i,min}^t \leq V_i^t \leq V_{i,max}^t \quad (8)$$

$$(P_{ij}^t)^2 + (Q_{ij}^t)^2 \leq (S_{ij,max}^t)^2 \quad (9)$$

where $P_{Gi,min}^t$ represents a minimum active power output of the generator at the $i^{th}$ node of the transmission network, $P_{Gi,max}^t$ represents a maximum active power output of the generator at the $i^{th}$ node of the transmission network, $Q_{Gi,min}^t$ represents a minimum reactive power output of the generator at the $i^{th}$ node of the transmission network, $Q_{Gi,max}^t$ represents a maximum reactive power output of the generator at the $i^{th}$ node of the transmission network, $V_{i,min}^t$ represents a minimum voltage magnitude at the $i^{th}$ node of the transmission network, $V_{i,max}^t$ represents a maximum voltage magnitude at the $i^{th}$ node of the transmission network, and $S_{ij,max}^t$ represents a transmission capacity of the $(ij)^{th}$ branch of the transmission network;

performing a second order cone relaxation on a non-convex constraint of the plurality of distribution network constraints;

solving the reactive power optimization model to acquire a first reactive power output of the generator at each node in the transmission network, a second reactive power output of the generator at each node in the plurality of distribution networks, so as to control each generator in the transmission network and each generator in the plurality of distribution networks according to the first reactive power output of the generator at each node in the transmission network, the second reactive power output of the generator at each node in the plurality of distribution networks, so as to optimize the transmission and distribution network.

2. The reactive power optimization method according to claim 1, wherein the objective function is established for minimizing a total network loss of the integrated network as follows:

$$\min\left(\left(\sum_{i\in I^t}(P^t_{Gi}-P^t_{Di})\right)+\sum_{k\in DIST}\left(\sum_{i\in I^t}\left(P^{d,k}_{Gi}-P^{d,k}_{Di}\right)\right)\right) \quad (1)$$

where $P_{Gi}^t$ represents a first active power output of a generator at an $i^{th}$ node of the transmission network, $P_{Di}^t$ represents a first active load at the $i^{th}$ node of the transmission network, $P_{Di}^{d,k}$ represents a second active power output of a generator at an $i^{th}$ node of a $k^{th}$ distribution network, $P_{Di}^{d,k}$ represents a second active load at the $i^{th}$ node of the $k^{th}$ distribution network, $I^t$ represents an index set of nodes in the transmission network, $I^{d,k}$ represents an index set of nodes in the $k^{th}$ distribution network, and DIST represents an index set of the plurality of distribution networks.

3. The reactive power optimization method according to claim 1, wherein the plurality of distribution network constraints comprise second power flow constraints and second security constraints, wherein the second power flow constraints are represented as:

$$(P^d_{ij})^2+(Q^d_{ij})^2=(I^d_{ij})^2(V^d_i)^2 \quad (10)$$

$$\sum_{i\in\pi(j)}\left(P^d_{ij}-(I^d_{ij})^2 r^d_{ij}\right)+P^d_{Gj}=\sum_{k\in v(j)}(P^d_{jk})+P^d_{Dj} \quad (11)$$

$$\sum_{i\in\pi(j)}\left(Q^d_{ij}-(I^d_{ij})^2 x^d_{ij}\right)+Q^d_{Gj}=\sum_{k\in v(j)}(Q^d_{jk})+Q^d_{Dj} \quad (12)$$

$$(V^d_j)^2=(V^d_i)^2-2(r^d_{ij}P^d_{ij}+x^d_{ij}Q^d_{ij})+\left((r^d_{ij})^2+(x^d_{ij})^2\right)(I^d_j)^2 \quad (13)$$

where $P_{ij}^d$ represents an active power flow of an $(ij)^{th}$ branch of the plurality of of distribution networks, $Q_{ij}^d$ represents a current magnitude of the $(ij)^{th}$ branch of the plurality of distribution networks, $I_{ij}^d$ represents a voltage magnitude at an $i^{th}$ node of the plurality of distribution networks, $V_i^d$ represents a resistance of the $(ij)^{th}$ branch of the plurality of distribution networks, $x_{ij}^d$ represents a reactance of the $(ij)^{th}$ branch of the plurality of distribution networks, u(j) represents a set of parent nodes of a $j^{th}$ node of the plurality of distribution networks, v(j) represents a set of parent nodes of a $j^{th}$ node of the plurality of distribution networks, $P_{Gj}^d$ represents a set of child nodes of the $j^{th}$ node of the plurality of distribution networks, $Q_{Gj}^d$ represents an active power output of a generator at the $j^{th}$ node of the plurality of distribution networks, $P_{Dj}^d$ represents an active load at the $j^{th}$ node of the plurality of distribution networks, $Q_{Gj}^d$ represents a reactive power output of the generator at the $j^{th}$ node of the plurality of distribution networks, $Q_{Dj}^d$ represents a reactive load at the $j^{th}$ node of the plurality of distribution networks, $P_{jk}^d$ represents an active power flow of a $(jk)^{th}$ branch of the plurality of distribution networks, and $Q_{jk}^d$ represents a reactive power flow of the $(jk)^{th}$ branch of the plurality of distribution networks; and the second security constraints are represented as:

$$P_{Gi,min}^d \le P_{Gi}^d \le P_{Gi,max}^d \quad (14)$$

$$Q_{Gi,min}^d \le Q_{Gi}^d \le Q_{Gi,max}^d \quad (15)$$

$$V_{i,min}^d \le V_i^d \le V_{i,max}^d \quad (16)$$

$$I_{ij}^d \le I_{ij,max}^d \quad (17)$$

where $P_{Gi}^d$ represents an active power output of a generator at the $i^{th}$ node of the plurality of distribution networks, $P_{Gi,min}^d$ represents a minimum active power output of the generator at the $i^{th}$ node of the plurality of distribution networks, $P_{Gi,max}^d$ represents a maximum active power output of the generator at the $i^{th}$ node of the plurality of distribution networks, $Q_{Gi}^d$ represents a reactive power output of the generator at the $i^{th}$ node of the plurality of distribution networks, $Q_{Gi,min}^d$ represents a minimum reactive power output of the generator at the $i^{th}$ node of the plurality of distribution networks, $Q_{Gi,max}^d$ represents a maximum reactive power output of the generator at the $i^{th}$ node of the plurality of distribution networks, $V_i^d$ represents a voltage magnitude at the $i^{th}$ node of the plurality of distribution networks, $V_{i,min}^d$ represents a minimum voltage magnitude at the $i^{th}$ node of the plurality of distribution networks, $V_{i,max}^d$ represents a maximum voltage magnitude at the $i^{th}$ node of the plurality of distribution networks, $I_{ij}^d$ represents a current magnitude of the $(ij)^{th}$ branch of the plurality of distribution networks, and $I_{ij,max}^d$ represents an upper limit of the current magnitude of the $(ij)^{th}$ branch of the plurality of distribution networks.

4. The reactive power optimization method according to claim 3, wherein the boundary constraints are represented as:

$$V_{\tau(k)}^t = V_{root}^{d,k} \quad (18)$$

$$P_{\tau(k)}^t = P_{root}^{d,k} \quad (19)$$

$$Q_{\tau(k)}^t = Q_{root}^{d,k} \quad (20)$$

where $V_{\tau(k)}^t$ represents a voltage magnitude at a node in the transmission network connected to the $k^{th}$ distribution network, $V_{root}^{d,k}$ represents a voltage magnitude at a root node of the $k^{th}$ distribution network, $P_{\tau(k)}^t$ represents an equivalent active load of the $k^{th}$ distribution network in the transmission network, $P_{root}^{d,k}$ represents an active power injection from the transmission network to the root node of the $k^{th}$ distribution network, $Q_{\tau(k)}^t$ represents an equivalent reactive load of the $k^{th}$ distribution network in the transmission network, and $Q_{root}^{d,k}$ represents an reactive power injection from the transmission network to the root node of the $k^{th}$ distribution network.

5. The reactive power optimization method according to claim 4, wherein performing the second order cone relaxation on the non-convex constraints of the plurality of distribution network constraints comprises:

introducing a first variable $L_{ij}^d$ and a second variable $U_i^d$ as follows:

$$L_{ij}^d = (I_{ij}^d)^2 \quad (21)$$

$$U_i^d = (V_i^d)^2 \quad (22)$$

simplifying the second power flow constraints using the first variable $L_{ij}^d$ and the second variable $U_i^d$ as follows:

$$(P_{ij}^d)^2 + (Q_{ij}^d)^2 = L_{ij}^d U_i^d \tag{23}$$

$$\sum_{i \in \pi(j)} (P_{ij}^d - L_{ij}^d r_{ij}^d) + P_{Gj}^d = \sum_{k \in \nu(j)} (P_{jk}^d) + P_{Dj}^d \tag{24}$$

$$\sum_{i \in \pi(j)} (Q_{ij}^d - L_{ij}^d x_{ij}^d) + Q_{Gj}^d = \sum_{k \in \nu(j)} (Q_{jk}^d) + Q_{Dj}^d \tag{25}$$

$$U_j^d = U_i^d - 2(r_{ij}^d P_{ij}^d + x_{ij}^d Q_{ij}^d) + ((r_{ij}^d)^2 + (x_{ij}^d)^2) L_{ij}^d \tag{26}$$

transforming formula (16) in the second security constraints to formula (27) using the second variable $U_i^d$:

$$(V_{i,min}^d)^2 \le U_i^d \le (V_{i,max}^d)^2 \tag{27}$$

performing a relaxation on formula (23) so as to acquire a formula of:

$$(P_{ij}^d)^2 \le (Q_{ij}^d)^2 \le L_{ij}^d U_i^d)^2 \tag{28}$$

representing the formula (28) in a format of standard second order cone constraint as follow:

$$\left\| \begin{array}{c} 2P_{ij}^d \\ 2Q_{ij}^d \\ L_{ij}^d - U_i^d \end{array} \right\|_2 \le L_{ij}^d + U_i^d. \tag{29}$$

6. The reactive power optimization method according to claim 5, wherein the reactive power optimization model is solved by using a generalized Benders decomposition method, and solving the reactive power optimization model comprises:
setting an initial iteration times q=0;
establishing a primal problem model and a plurality of sub-problem models by decomposing the reactive power optimization model based on the generalized Benders decomposition method;
solving the primal problem model by the transmission network operator and the plurality of sub-problem models by the plurality of distribution network operators respectively; and
judging that an iteration for solving the reactive power optimization model is convergent if all of the plurality of sub-problem models are feasible, and stopping the iteration; generating a feasible cut for each infeasible sub-problem model if there is at least one infeasible sub-problem model, and performing a next iteration by solving the primal problem model by the transmission network operator and the plurality of sub-problem models undergoing the feasible cut by the plurality of distribution network operators respectively again.

7. The reactive power optimization method according to claim 6, wherein the primal problem model is represented as formula (30) and an optimal solution of the primal problem model is $\hat{y}$:

$$\min_{y \in Y} P_{G,ref}^t \tag{30}$$

$$\text{s.t. } L_*(y, \lambda^j) \le 0, j = 1, 2, \ldots, q$$

where y represents a vector of all variables of the transmission network, Y represents a set of all the transmission network constraints, $P_{G,ref}^t$ is an active power output of a generator at a reference node of the transmission network, $\lambda^j$ is a multiplier, L* is a function representing the feasible cut;
the sub-problem model for the $k^{th}$ distribution network is represented as formula (31):

$$\min_{x_k} f_k(x_k, \hat{y}) \tag{31}$$

$$\text{s.t. } H_k(x_k, \hat{y}) = 0$$

$$x_k \in X_k$$

where $X_k$ represents a vector of variables of the $k^{th}$ distribution network, $\hat{y}$ represents a solution obtained from (30), $f_k$ represents a function of network loss of the $k^{th}$ distribution network, $H_k(x_k,\hat{y})=0$ are a vector of boundary constraints between the transmission network and the $k^{th}$ distribution network, $X_k$ is a set of all constraints of the $k^{th}$ distribution network.

8. The reactive power optimization method according to claim 6, wherein generating a feasible cut for at least one infeasible sub-problem model comprises:
generating the sub-problem model satisfying a relaxed boundary constraint as follows:

$$\min_{s_k \in X_k} \sum_{i=1}^{6} \alpha_i \tag{32}$$

$$\text{s.t. } P_{root}^{d,k} - \hat{P}_{\tau(k)}^t \le \alpha_1, -P_{root}^{d,k} + \hat{P}_{\tau(k)}^t \le \alpha_2$$

$$Q_{root}^{d,k} - \hat{Q}_{\tau(k)}^t \le \alpha_3, -Q_{root}^{d,k} + \hat{Q}_{\tau(k)}^t \le \alpha_4$$

$$U_{root}^{d,k} - (\hat{V}_{\tau(k)}^t)^2 \le \alpha_5, -U_{root}^{d,k} + (V_{\tau(k)}^t)^2 \le \alpha_6$$

$$\alpha_i \ge 0, i = 1, 2, \ldots, 6$$

where $\hat{P}_{\tau(k)}^t$, $\hat{Q}_{\tau(k)}^t$ and $\hat{V}_{\tau(k)}^t$ represent variables transferred from the primal problem model, $U_{root}^{d,k}$ is a square of $V_{root}^{d,k}$ in (18), $\alpha_1 \sim \alpha_6$ are relaxation terms;
solving the sub-problem model satisfying the relaxed boundary constraint, wherein Lagrangian multipliers in formula (32) are $\lambda_1 \sim \lambda_6$ corresponding to inequations whose right sides are $\alpha_1 \sim \alpha_6$;
introducing variables $\lambda_P$, $\lambda_Q$ and $\lambda_V$ as follows:

$$\lambda_P = \lambda_1 - \lambda_2$$

$$\lambda_Q = \lambda_3 - \lambda_4$$

$$\lambda_V = \lambda_5 - \lambda_6 \tag{33}$$

generating the feasible cut:

$$L_*(y, \hat{\lambda}) = \inf_{x \in X} \{\hat{\lambda}^T H(x, y)\}, y \in Y \tag{34}$$

$$= \inf_{x \in X} \left\{ \begin{array}{c} \lambda_P(P_{root}^{d,k} - P_{\tau(k)}^t) + \lambda_Q(Q_{root}^{d,k} - Q_{\tau(k)}^t) + \\ \lambda_V(U_{root}^{d,k} - (V_{\tau(k)}^t)^2) \end{array} \right\}, y \in Y$$

$$= \inf_{x \in X} \{\lambda_P P_{root}^{d,k} + \lambda_Q Q_{root}^{d,k} + \lambda_V U_{root}^{d,k}\} -$$

$$(\lambda_P P_{\tau(k)}^t + \lambda_Q Q_{\tau(k)}^t + \lambda_V (V_{\tau(k)}^t)^2), y \in Y$$

simplifying formula (34) to a formula of $$\lambda_P P^t_{\tau(k)} + \lambda_Q Q^t_{\tau(k)} + \lambda_V (V^t_{\tau(k)})^2 \geq \lambda_{val} \text{ where} \quad (35)$$

$$\lambda_{val} = \inf_{x \in X} \{\lambda_P P^{d,k}_{root} + \lambda_Q Q^{d,k}_{root} + \lambda_V U^{d,k}_{root}\} \quad (36)$$

representing the feasible cut of formula (35) as follows:

$$L_*(y, \hat{\lambda}) = \inf_{x_k \in X_k} \{\hat{\lambda}^T H(x_k, y)\}, y \in Y \quad (37)$$

adding one on q and letting $\lambda^q = \hat{\lambda}$.

9. A reactive power optimization apparatus, comprising:
a processor;
a memory configured to store an instruction executable by the processor;
wherein the processor is configured to:
establish a reactive power optimization model for an integrated network consisting of a transmission network and a plurality of distribution networks based on a first active power output of a generator at each node in the transmission network acquired from a dispatch schedule of a transmission network operator, a first load at each node in the transmission network acquired from a load forecast system of the transmission network, a second active power output of a generator at each node in the plurality of distribution networks acquired from a dispatch schedule of each distribution network operator and a second load at each node in the plurality of distribution networks acquired from a load forecast system of each distribution network, wherein the reactive power optimization model comprises an objective function and a plurality of constraints, and the plurality of constraints include a plurality of transmission network constraints, a plurality of distribution network constraints and boundary constraints between the transmission network and the plurality of distribution networks, wherein, the plurality of transmission network constraints comprise first power flow constraints and first security constraints, wherein the first power flow constraints are represented as:

$$P^t_{ij} = V^t_i V^t_j (G^t_{ij} \cos\theta^t_{ij} + B^t_{ij} \sin\theta^t_{ij}) \quad (2)$$

$$Q^t_{ij} = V^t_i V^t_j (G^t_{ij} \sin\theta^t_{ij} - B^t_{ij} \cos\theta^t_{ij}) \quad (3)$$

$$\sum_{j \in \pi(i)} P^t_{ij} = P^t_{Gi} - P^t_{Di} \quad (4)$$

$$\sum_{j \in \pi(i)} Q^t_{ij} = Q^t_{Gi} - Q^t_{Di} \quad (5)$$

where $P^t_{ij}$ represents an active power flow in an $(ij)^{th}$ branch of the transmission network, $Q^t_{ij}$ represents a reactive power flow of the $(ij)^{th}$ branch of the transmission network, $V^t_i$ represents a voltage magnitude at the $i^{th}$ node of the transmission network, $V^t_j$ represents the voltage magnitude at a $j^{th}$ node of the transmission network, $G^t_{ij}$ represents an equivalent conductance of the $(ij)^{th}$ branch of the transmission network, $B^t_{ij}$ represents an equivalent susceptance of the $(ij)^{th}$ branch of the transmission network, $\theta^t_{ij}$ represents a voltage angle difference of the $(ij)^{th}$ branch of the transmission network, $\pi(i)$ represents a set of nodes directly connected to the $i^{th}$ node of the transmission network, $Q^t_{Gi}$ represents a reactive power output of the generator at the $i^{th}$ node of the transmission network, and $Q^t_{Di}$ represents a reactive load at the $i^{th}$ node of the transmission network; and
the first security constraints are represented as:

$$P_{Gi,min}^t \leq P_{Gi}^t \leq P_{Gi,max}^t \quad (6)$$

$$Q_{Gi,min}^t \leq Q_{Gi}^t \leq Q_{Gi,max}^t \quad (7)$$

$$V_{i,min}^t \leq V_i^t \leq V_{i,max}^t \quad (8)$$

$$(P_{ij}^t)^2 + (Q_{ij}^t)^2 \leq (S_{ij,max}^t)^2 \quad (9)$$

where $P_{Gi,min}^t$ represents a minimum active power output of the generator at the $i^{th}$ node of the transmission network, $P_{Gi,max}^t$ represents a maximum active power output of the generator at the $i^{th}$ node of the transmission network, $Q_{Gi,min}^t$ represents a minimum reactive power output of the generator at the $i^{th}$ node of the transmission network, $Q_{Gi,max}^t$ represents a maximum reactive power output of the generator at the $i^{th}$ node of the transmission network, $V_{i,min}^t$ represents a minimum voltage magnitude at the $i^{th}$ node of the transmission network, $V_{i,max}^t$ represents a maximum voltage magnitude at the $i^{th}$ node of the transmission network, and $S_{ij,max}^t$ represents a transmission capacity of the $(ij)^{th}$ branch of the transmission network;
perform a second order cone relaxation on a non-convex constraint of the plurality of distribution network constraints;
solve the reactive power optimization model to acquire a first reactive power output of the generator at each node in the transmission network, a second reactive power output of the generator at each node in the plurality of distribution networks, so as to control each generator in the transmission network and each generator in the plurality of distribution networks according to the first reactive power output of the generator at each node in the transmission network, the second reactive power output of a generator at each node in the plurality of distribution networks, so as to optimize the transmission and distribution network.

10. The reactive power optimization apparatus according to claim 9, wherein the objective function is established for minimizing a total network loss of the integrated network as follows:

$$\min\left(\left(\sum_{i \in I^t}(P^t_{Gi} - P^t_{Di})\right) + \sum_{k \in DIST}\left(\sum_{i \in I^{d,k}}(P^{d,k}_{Gi} - P^{d,k}_{Di})\right)\right) \quad (1)$$

where $P_{Gi}^t$ represents a first active power output of a generator at an $i^{th}$ node of the transmission network, $P_{Di}^t$ represents a first active load at the $i^{th}$ node of the transmission network, $P_{Gi}^{d,k}$ represents a second active power output of a generator at an $i^{th}$ node in a $k^{th}$ distribution network, $P_{Di}^{d,k}$ represents a second active load at the $i^{th}$ node of the $k^{th}$ distribution network, $I^t$ represents an index set of nodes in the transmission network, $I^{d,k}$ represents an index set of nodes in the $k^{th}$ distribution network, and DIST represents an index set of the plurality of distribution networks.

11. The reactive power optimization apparatus according to claim 9, wherein the plurality of distribution network constraints comprise second power flow constraints and second security constraints, wherein the second power flow constraints are represented as:

$$(P_{ij}^d)^2 + (Q_{ij}^d)^2 = (I_{ij}^d)^2(V_i^d)^2 \tag{10}$$

$$\sum_{i \in u(j)} (P_{ij}^d - (I_{ij}^d)^2 r_{ij}^d) + P_{Gj}^d = \sum_{k \in v(j)} (P_{jk}^d) + P_{Dj}^d \tag{11}$$

$$\sum_{i \in u(j)} (Q_{ij}^d - (I_{ij}^d)^2 x_{ij}^d) + Q_{Gj}^d = \sum_{k \in v(j)} (Q_{jk}^d) + Q_{Dj}^d \tag{12}$$

$$(V_j^d)^2 = (V_i^d)^2 - 2(r_{ij}^d P_{ij}^d + x_{ij}^d Q_{ij}^d) + ((r_{ij}^d)^2 + (x_{ij}^d)^2)(I_{ij}^d)^2 \tag{13}$$

where $P_{ij}^d$ represents an reactive power flow of than $(ij)^{th}$ branch of the plurality of distribution networks, $I_{ij}^d$ represents a current magnitude of the $(ij)^{th}$ branch of the plurality of distribution networks, $V_i^d$ represents a voltage magnitude at an $i^{th}$ node of the plurality of distribution networks, $r_{ij}^d$ represents a resistance of the $(ij)^{th}$ branch of the plurality of distribution networks, $x_{ij}^d$ represents a reactance of the $(ij)^{th}$ branch of the plurality of distribution networks, $u(j)$ represents a set of parent nodes of a $j^{th}$ node of the plurality of distribution networks, $v(j)$ represents a set of child nodes of the $j^{th}$ node of the plurality of distribution networks, $P_{Gj}^d$ represents an active power output of a generator at the $j^{th}$ node of the plurality of distribution networks, $P_{Dj}^d$ represents an active load at the $j^{th}$ node of the plurality of distribution networks, $Q_{Gj}^d$ represents a reactive power output of the generator at the $j^{th}$ node of the plurality of distribution networks, $Q_{Dj}^d$ represents a reactive load at the $j^{th}$ node of the plurality of distribution networks, $P_{jk}^d$ represents an active power flow of a $(jk)^{th}$ branch of the plurality of distribution networks, and $Q_{jk}^d$ represents a reactive power flow of the $(jk)^{th}$ branch of the plurality of distribution networks; and the second security constraints are represented as:

$$P_{Gi,min}^d \leq P_{Gi}^d \leq P_{Gi,max}^d \tag{14}$$

$$Q_{Gi,min}^d \leq Q_{Gi}^d \leq Q_{Gi,max}^d \tag{15}$$

$$V_{i,min}^d \leq V_i^d \leq V_{i,max}^d \tag{16}$$

$$I_{ij}^d \leq I_{ij,max}^d \tag{17}$$

where $P_{Gi}^d$ represents an active power output of a generator at the $i^{th}$ node of the plurality of distribution networks, $P_{Gi,min}^d$ represents a minimum active power output of the generator at the $i^{th}$ node of the plurality of distribution networks, $P_{Gi,max}^d$ represents a maximum active power output of the generator at the $i^{th}$ node of the plurality of distribution networks, $P_{Gi}^d$ represents a reactive power output of the generator at the $i^{th}$ node of the plurality of distribution networks, $Q_{Gi,min}^d$ represents a minimum reactive power output of the generator at the $i^{th}$ node of the plurality of distribution networks, $Q_{Gi,max}^d$ represents a maximum reactive power output of the generator at the $i^{th}$ node of the plurality of distribution networks, $V_i^d$ represents a voltage magnitude at the $i^{th}$ node of the plurality of distribution networks, $V_{i,min}^d$ represents a minimum voltage magnitude at the $i^{th}$ node of the plurality of distribution networks, $V_{i,max}^d$ represents a maximum voltage magnitude at the $i^{th}$ node of the plurality of distribution networks, $I_{ij}^d$ represents a current magnitude of the $(ij)^{th}$ branch of the plurality of distribution networks, and $I_{ij,max}^d$ represents an upper limit of the current magnitude of the $(ij)^{th}$ branch of the plurality of distribution networks.

12. The reactive power optimization apparatus according to claim 11, wherein the boundary constraints are represented as:

$$V_{\tau(k)}^t = V_{root}^{d,k} \tag{18}$$

$$P_{\tau(k)}^t = P_{root}^{d,k} \tag{19}$$

$$Q_{\tau(k)}^t = Q_{root}^{d,k} \tag{20}$$

where $V_{\tau(k)}^t$ represents a voltage magnitude at a node in the transmission network connected to the $k^{th}$ distribution network, $V_{root}^{d,k}$ represents a voltage magnitude at a root node of the $k^{th}$ distribution network, $P_{\tau(k)}^t$ represents an equivalent active load of the $k^{th}$ distribution network in the transmission network, $P_{root}^{d,k}$ represents an active power injection from the transmission network to the root node of the $k^{th}$ distribution network, $Q_{\tau(k)}^t$ represents an equivalent reactive load of the $k^{th}$ distribution network in the transmission network, an $Q_{root}^{d,k}$ represents an reactive power injection from the transmission network to the root node of the $k^{th}$ distribution network.

13. The reactive power optimization apparatus according to claim 12, wherein the processor is further configured to: introduce a first variable $L_{ij}^d$ and a second variable $U_i^d$ as follows:

$$L_{ij}^d = (I_{ij}^d)^2 \tag{21}$$

$$U_i^d = (V_i^d)^2 \tag{22}$$

simplify the second power flow constraints using the first variable $L_{ij}^d$ and the second variable $U_i^d$ as follows:

$$(P_{ij}^d)^2 + (Q_{ij}^d)^2 = L_{ij}^d U_i^d \tag{23}$$

$$\sum_{i \in u(j)} (P_{ij}^d - L_{ij}^d r_{ij}^d) + P_{Gj}^d = \sum_{k \in v(j)} (P_{jk}^d) + P_{Dj}^d \tag{24}$$

$$\sum_{i \in u(j)} (Q_{ij}^d - L_{ij}^d x_{ij}^d) + Q_{Gj}^d = \sum_{k \in v(j)} (Q_{jk}^d) + Q_{Dj}^d \tag{25}$$

$$U_j^d = U_i^d - 2(r_{ij}^d P_{ij}^d + x_{ij}^d Q_{ij}^d) + ((r_{ij}^d)^2 + (x_{ij}^d)^2) L_{ij}^d \tag{26}$$

transform formula (16) in the second security constraint to formula (27) using the second variable $U_i^d$:

$$(V_{i,min}^d)^2 \leq U_i^d \leq (V_{i,max}^d)^2 \tag{27}$$

perform a relaxation on formula (23) so as to acquire a formula of:

$$(P_{ij}^d)^2 \leq (Q_{ij}^d)^2 \leq L_{ij}^d U_i^d \tag{28}$$

represent the formula (28) in a format of standard second order cone constraint as follow:

$$\left\| \begin{array}{c} 2P_{ij}^d \\ 2Q_{ij}^d \\ L_{ij}^d - U_i^d \end{array} \right\|_2 \leq L_{ij}^d + U_i^d. \tag{29}$$

14. The reactive power optimization apparatus according to claim 13, wherein the reactive power optimization model is solved by using a generalized Benders decomposition method, and the processor is further configured to:
set an initial iteration times q=0;
establish a primal problem model and a plurality of sub-problem models by decomposing the reactive power optimization model based on the generalized Benders decomposition method;
solve the primal problem model by the transmission network operator and the plurality of sub-problem models by the plurality of distribution network operators respectively;
judge that an iteration for solving the reactive power optimization model is convergent if all of the plurality of sub-problem models are feasible, and stop the iteration; generate a feasible cut for each infeasible sub-problem model if there is at least one infeasible sub-problem model, and perform a next iteration by solving the primal problem model by the transmission network operator and the plurality of sub-problem models undergoing the feasible cut and by the plurality of distribution network operators respectively again.

15. The reactive power optimization apparatus according to claim 14, wherein the primal problem model is represented as formula (30) and an optimal solution of the primal problem model is $\hat{y}$:

$$\min_{y \in Y} P_{G,ref}^t \quad (30)$$
$$\text{s.t.} \quad L_*(y, \lambda^j) \leq 0, \, j = 1, 2, \ldots, q$$

where y represents a vector of all variables of the transmission network, Y represents a set of all the transmission network constraints, $P_{G,ref}^t$ is an active power output of a generator at a reference node of the transmission network, $\lambda^j$ is a multiplier, $L_*$ is a function representing the feasible cut;
the sub-problem model for the $k^{th}$ distribution network is represented as formula (31):

$$\min_{x_k} f_k(x_k, \hat{y}) \quad (31)$$
$$\text{s.t.} \quad H_k(x_k, \hat{y}) = 0$$
$$x_k \in X_k$$

where $x_k$ represents a vector of variables of the $k^{th}$ distribution network, $\hat{y}$ represents a solution obtained from (30), $f_k$ represents a function of network loss of the $k^{th}$ distribution network, $H_k(x_k, \hat{y})=0$ are a vector of boundary constraints between the transmission network and the $k^{th}$ distribution network, $X_k$ is a set of all constraints of the $k^{th}$ distribution network.

16. The reactive power optimization apparatus according to claim 15, wherein the processor is further configured to:
generate the sub-problem model satisfying a relaxed boundary constraint as follows:

$$\min_{x_k \in X_k} \sum_{i=1}^{6} \alpha_i \quad (32)$$

-continued
$$\text{s.t.} \quad P_{root}^{d,k} - \hat{P}_{\tau(k)}^t \leq \alpha_1, \, -P_{root}^{d,k} + \hat{P}_{\tau(k)}^t \leq \alpha_2$$
$$Q_{root}^{d,k} - \hat{Q}_{\tau(k)}^t \leq \alpha_3, \, -Q_{root}^{d,k} + \hat{Q}_{\tau(k)}^t \leq \alpha_4$$
$$U_{root}^{d,k} - (\hat{V}_{\tau(k)}^t)^2 \leq \alpha_5, \, -U_{root}^{d,k} + (\hat{V}_{\tau(k)}^t)^2 \leq \alpha_6$$
$$\alpha_i \geq 0, \, i = 1, 2, \ldots, 6$$

where $\hat{P}_{\tau(k)}^t$, $\hat{Q}_{\tau(k)}^t$ and $\hat{V}_{\tau(k)}^t$ represent variables transferred from the primal problem model, $U_{root}^{d,k}$ is a square of $V_{root}^{d,k}$ in (18), $\alpha_1 \sim \alpha_6$ are relaxation terms;
solve the sub-problem model satisfying the relaxed boundary constraint, wherein Lagrangian multipliers in formula (32) are $\lambda_1 \sim \lambda_6$ corresponding to inequations whose right sides are $\alpha_1 \sim \alpha_6$;
introduce variables $\lambda_P$, $\lambda_Q$ and $\lambda_V$ as follows:

$$\lambda_P = \lambda_1 - \lambda_2$$
$$\lambda_Q = \lambda_3 - \lambda_4$$
$$\lambda_V = \lambda_5 - \lambda_6 \quad (33)$$

generate the feasible cut:

$$L_*(y, \hat{\lambda}) = \inf_{x \in X}\{\hat{\lambda}^T H(x, y)\}, \, y \in Y \quad (34)$$

$$= \inf_{x \in X}\left\{\begin{array}{c}\lambda_P(P_{root}^{d,k} - P_{\tau(k)}^t) + \lambda_Q(Q_{root}^{d,k} - Q_{\tau(k)}^t) + \\ \lambda_V(U_{root}^{d,k} - (V_{\tau(k)}^t)^2)\end{array}\right\}, \, y \in Y$$

$$= \inf_{x \in X}\{\lambda_P P_{root}^{d,k} + \lambda_Q Q_{root}^{d,k} + \lambda_V U_{root}^{d,k}\} -$$
$$(\lambda_P P_{\tau(k)}^t + \lambda_Q Q_{\tau(k)}^t + \lambda_V (V_{\tau(k)}^t)^2), \, y \in Y$$

simplify formula (34) to a formula of $$\lambda_P P_{\tau(k)}^t + \lambda_Q Q_{\tau(k)}^t + \lambda_V (V_{\tau(k)}^t)^2 \geq \lambda_{val} \quad (35)$$

where $$\lambda_{val} = \inf_{x \in X}\{\lambda_P P_{root}^{d,k} + \lambda_Q Q_{root}^{d,k} + \lambda_V U_{root}^{d,k}\} \quad (36)$$

represent the feasible cut of formula (35) as follows:

$$L_*(y, \hat{\lambda}) = \inf_{x_k \in X_k}\{\hat{\lambda}^T H(x_k, \hat{y})\}, \, y \in Y \quad (37)$$

add one on q and set $\lambda^q = \hat{\lambda}$.

17. A non-transitory computer-readable storage medium having stored therein instructions that, when executed by a processor of a terminal, causes the terminal to perform a reactive power optimization method for running an application program, the reactive power optimization method comprising:
establishing a reactive power optimization model for an integrated network consisting of a transmission network and a plurality of distribution networks based on a first active power output of a generator at each node in the transmission network acquired from a dispatch schedule of a transmission network operator, a first load at each node in the transmission network acquired from a load forecast system of the transmission network, a second active power output of a generator at each node in the plurality of distribution networks acquired from a dispatch schedule of each distribution network operator and a second load at each node in the plurality of distribution networks acquired from a load forecast system of each distribution network, wherein the reactive power optimization model comprises an objective function and a plurality of constraints, and the plurality of constraints include a plurality of transmission network constraints, a plurality of distribution network constraints and boundary constraints between the transmission network and the plurality of distribution networks, wherein, the plurality of transmission network constraints comprise first power flow constraints and first security constraints, wherein the first power flow constraints are represented as:

$$P_{ij}^t = V_i^t V_j^t (G_{ij}^t \cos\theta_{ij}^t + B_{ij}^t \sin\theta_{ij}^t) \quad (2)$$

$$Q_{ij}^t = V_i^t V_j^t (G_{ij}^t \sin\theta_{ij}^t - B_{ij}^t \cos\theta_{ij}^t) \quad (3)$$

$$\sum_{j \in \pi(i)} P_{ij}^t = P_{Gi}^t - P_{Di}^t \quad (4)$$

$$\sum_{j \in \pi(i)} Q_{ij}^t = Q_{Gi}^t - Q_{Di}^t \quad (5)$$

where $P_{ij}^t$ represents an active power flow in an $(ij)^{th}$ branch of the transmission network, $Q_{ij}^t$ represents a reactive power flow of the $(ij)^{th}$ branch of the transmission network, $V_i^t$ represents a voltage magnitude at the $i^{th}$ node of the transmission network, $V_j^t$ represents the voltage magnitude at a $j^{th}$ node of the transmission network, $G_{ij}^t$ represents an equivalent conductance of the $(ij)^{th}$ branch of the transmission network, $G_{ij}^t$ represents an equivalent susceptance of the $(ij)^{th}$ branch of the transmission network, $B_{ij}^t$ represents a voltage angle difference of the $(ij)^{th}$ branch of the transmission network, $\theta_{ij}^t$ represents a set of nodes directly connected to the $i^{th}$ node of the transmission network, $Q_{Gi}^t$ represents a reactive power output of the generator at the $i^{th}$ node of the transmission network, and $Q_{Di}^t$ represents a reactive load at the $i^{th}$ node of the transmission network; and the first security constraints are represented as:

$$P_{Gi,min}^t \leq P_{Gi}^t \leq P_{Gi,max}^t \quad (6)$$

$$Q_{Gi,min}^t \leq Q_{Gi}^t \leq Q_{Gi,max}^t \quad (7)$$

$$V_{i,min}^t \leq V_i^t \leq V_{i,max}^t \quad (8)$$

$$(P_{ij}^t)^2 + (Q_{ij}^t)^2 \leq (S_{ij,max}^t)^2 \quad (9)$$

where $P_{Gi,min}^t$ represents a minimum active power output of the generator at the $i^{th}$ node of the transmission network, $P_{Gi,max}^t$ represents a maximum active power output of the generator at the $i^{th}$ node of the transmission network, $Q_{Gi,min}^t$ represents a minimum reactive power output of the generator at the $i^{th}$ node of the transmission network, $Q_{Gi,max}^t$ represents a maximum reactive power output of the generator at the $i^{th}$ node of the transmission network, $V_{i,min}^t$ represents a minimum voltage magnitude at the $i^{th}$ node of the transmission network, $V_{i,max}^t$ represents a maximum voltage magnitude at the $i^{th}$ node of the transmission network, and $S_{ij,max}^t$ represents a transmission capacity of the $(ij)^{th}$ branch of the transmission network;

performing a second order cone relaxation on a non-convex constraint of the plurality of distribution network constraints;

solving the reactive power optimization model to acquire a first reactive power output of the generator at each node in the transmission network, a second reactive power output of the generator at each node in the plurality of distribution networks so as to control each generator in the transmission network and each generator in the plurality of distribution networks according to the first reactive power output of the generator at each node in the transmission network, the second reactive power output of a generator at each node in the plurality of distribution networks, so as to optimize the transmission and distribution network.

* * * * *